(12) United States Patent
Grange et al.

(10) Patent No.: US 11,026,085 B2
(45) Date of Patent: *Jun. 1, 2021

(54) AUTHENTICATION APPARATUS WITH A BLUETOOTH INTERFACE

(71) Applicant: OneSpan North America Inc., Chicago, IL (US)

(72) Inventors: Benoit Grange, Bordeaux (FR); Johan Verrept, Niel (BE); Mathias Claes, Sint-Pieters-Leeuw (BE)

(73) Assignee: OneSpan North America Inc., Chicago, IL (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/437,782

(22) Filed: Feb. 21, 2017

(65) Prior Publication Data

US 2017/0171755 A1 Jun. 15, 2017

Related U.S. Application Data

(63) Continuation of application No. 14/571,510, filed on Dec. 16, 2014, now Pat. No. 9,614,815.

(Continued)

(51) Int. Cl.
*H04W 12/06* (2021.01)
*H04L 29/06* (2006.01)

(Continued)

(52) U.S. Cl.
CPC ............ *H04W 12/06* (2013.01); *G06F 21/32* (2013.01); *G06F 21/35* (2013.01); *G06F 21/43* (2013.01); *H04B 1/3833* (2013.01); *H04L 9/0861* (2013.01); *H04L 9/3242* (2013.01); *H04L 9/3271* (2013.01); *H04L 63/0428* (2013.01); *H04L 63/06* (2013.01); *H04L 63/083* (2013.01); *H04L 63/0838* (2013.01); *H04L 63/0853* (2013.01); *H04L 63/0861* (2013.01);

(Continued)

(58) Field of Classification Search
CPC combination set(s) only.
See application file for complete search history.

(56) References Cited

U.S. PATENT DOCUMENTS 5,761,309 A * 6/1998 Ohashi ................ G06Q 20/341
713/156
6,772,331 B1 * 8/2004 Hind ...................... G06F 21/445
713/151

(Continued)

FOREIGN PATENT DOCUMENTS

CN 102648610 A 8/2012
GB 2408129 A 5/2005
(Continued)

OTHER PUBLICATIONS

Beyondlogic: "USB in Nutshell", author unknown, found at www.beyondlogic.org, Mar. 2011.*

(Continued)

*Primary Examiner* — Piotr Poltorak
(74) *Attorney, Agent, or Firm* — Culhane Meadows PLLC; Stephen J. Weed

(57) ABSTRACT

Methods, apparatus, and systems for securing the interactions of a user with an application using a Bluetooth enabled authentication device are disclosed.

53 Claims, 4 Drawing Sheets

Related U.S. Application Data

(60) Provisional application No. 61/921,743, filed on Dec. 30, 2013.

(51) Int. Cl.
| | | |
|---|---|---|
| *H04W 4/80* | (2018.01) | |
| *G06F 21/32* | (2013.01) | |
| *G06F 21/35* | (2013.01) | |
| *G06F 21/43* | (2013.01) | |
| *H04W 76/10* | (2018.01) | |
| *H04B 1/3827* | (2015.01) | |
| *H04L 9/08* | (2006.01) | |
| *H04L 9/32* | (2006.01) | |
| *H04W 12/04* | (2021.01) | |

(52) U.S. Cl.
CPC ............ *H04W 4/80* (2018.02); *H04W 12/04* (2013.01); *H04W 12/068* (2021.01); *H04W 76/10* (2018.02)

(56) References Cited

U.S. PATENT DOCUMENTS

| | | | |
|---|---|---|---|
| 7,032,240 B1 * | 4/2006 | Cronce | G06F 21/34 705/51 |
| 7,194,761 B1 * | 3/2007 | Champagne | G06F 21/31 709/232 |
| 7,379,919 B2 * | 5/2008 | Hogan | G06Q 20/02 705/40 |
| 8,028,083 B2 * | 9/2011 | Audebert | H04L 12/4633 709/238 |
| 8,065,718 B2 * | 11/2011 | Grove | G06F 21/31 713/172 |
| 8,094,890 B2 * | 1/2012 | Aikawa | G06K 9/00885 283/68 |
| 8,417,936 B2 | 4/2013 | Iwao et al. | |
| 8,572,392 B2 * | 10/2013 | Ishidera | G06F 21/34 380/279 |
| 8,595,810 B1 | 11/2013 | Ben Ayed | |
| 8,825,928 B2 * | 9/2014 | Jeal | G06F 21/12 320/128 |
| 9,021,601 B2 | 4/2015 | Grange et al. | |
| 9,154,483 B1 | 10/2015 | Haskin et al. | |
| 9,194,168 B1 * | 11/2015 | Lu | E05F 15/70 |
| 9,391,772 B2 | 7/2016 | Suzuki | |
| 9,608,818 B2 | 3/2017 | Shiota et al. | |
| 10,055,567 B2 * | 8/2018 | Ulrich | G06F 21/34 |
| 2001/0036273 A1 | 11/2001 | Yoshizawa | H04L 63/083 380/247 |
| 2001/0045451 A1 * | 11/2001 | Tan | G06F 21/33 235/375 |
| 2002/0069364 A1 * | 6/2002 | Dosch | G06F 1/1626 726/26 |
| 2002/0129250 A1 * | 9/2002 | Kimura | G06Q 20/341 713/172 |
| 2002/0133396 A1 * | 9/2002 | Barnhart | G06Q 10/10 705/12 |
| 2005/0037734 A1 * | 2/2005 | Tanaka | H04M 1/72533 455/411 |
| 2005/0149745 A1 * | 7/2005 | Ishidoshiro | G06F 21/602 713/189 |
| 2006/0129838 A1 * | 6/2006 | Chen | G06F 21/32 713/186 |
| 2006/0281451 A1 * | 12/2006 | Zur | H04L 63/1458 455/422.1 |
| 2007/0022196 A1 * | 1/2007 | Agrawal | G06F 21/34 709/225 |
| 2007/0150419 A1 * | 6/2007 | Kozlay | G06Q 20/12 705/67 |
| 2007/0192601 A1 | 8/2007 | Spain et al. | |
| 2007/0245148 A1 | 10/2007 | Buer | |
| 2008/0216172 A1 | 9/2008 | Forman et al. | |
| 2008/0307515 A1 * | 12/2008 | Drokov | G06Q 20/32 726/7 |
| 2009/0095812 A1 | 4/2009 | Brown et al. | |
| 2009/0158404 A1 * | 6/2009 | Hahn | H04L 63/083 726/5 |
| 2009/0193511 A1 | 7/2009 | Noe et al. | |
| 2009/0235339 A1 * | 9/2009 | Mennes | G06F 21/33 726/5 |
| 2009/0248913 A1 | 10/2009 | Salokannel | |
| 2009/0249478 A1 | 10/2009 | Rosener et al. | |
| 2010/0138914 A1 * | 6/2010 | Davis | G06F 21/32 726/19 |
| 2010/0222000 A1 | 9/2010 | Sauer et al. | |
| 2011/0010552 A1 | 1/2011 | Hoornaert et al. | |
| 2011/0099384 A1 * | 4/2011 | Grange | H04L 9/0897 713/184 |
| 2011/0231911 A1 | 9/2011 | White et al. | |
| 2011/0258452 A1 * | 10/2011 | Coulier | G06F 21/31 713/171 |
| 2012/0137128 A1 | 5/2012 | Buer | |
| 2012/0142271 A1 | 6/2012 | Zhodzishsky et al. | |
| 2012/0216133 A1 * | 8/2012 | Barker | G06F 21/629 715/760 |
| 2012/0221859 A1 * | 8/2012 | Marien | G06F 21/34 713/172 |
| 2013/0081122 A1 | 3/2013 | Svigals et al. | |
| 2013/0086389 A1 | 4/2013 | Suwald | |
| 2013/0174237 A1 * | 7/2013 | Zises | G06F 21/32 726/7 |
| 2013/0268767 A1 * | 10/2013 | Schrecker | G06F 21/31 713/185 |
| 2014/0040628 A1 * | 2/2014 | Fort | G06F 21/34 713/182 |
| 2014/0120905 A1 | 5/2014 | Kim | |
| 2014/0149742 A1 | 5/2014 | Yau | |
| 2014/0359067 A1 | 12/2014 | Zises | |
| 2015/0033306 A1 * | 1/2015 | Dickenson | G06F 21/31 726/7 |
| 2015/0140966 A1 * | 5/2015 | Narendra | G06F 21/35 455/411 |
| 2015/0215310 A1 * | 7/2015 | Gill | H04L 63/0853 726/7 |
| 2015/0304843 A1 | 10/2015 | Hillyard | |
| 2015/0373390 A1 * | 12/2015 | Park | H04N 21/4181 725/81 |
| 2016/0191473 A1 * | 6/2016 | De Wasch | H04L 63/126 713/171 |
| 2016/0278006 A1 | 9/2016 | Lee et al. | |
| 2016/0301687 A1 | 10/2016 | Lu et al. | |
| 2017/0257359 A1 * | 9/2017 | Ogawa | G06F 21/30 |

FOREIGN PATENT DOCUMENTS

| | | |
|---|---|---|
| JP | 2001352324 A | 12/2001 |
| JP | 2002259344 A | 9/2002 |
| JP | 2003302989 A | 10/2003 |
| JP | 2006172440 A | 6/2006 |
| JP | 2007334644 A | 12/2007 |
| JP | 2008040907 A | 2/2008 |
| JP | 2009064310 A | 3/2009 |
| JP | 2009212625 A | 9/2009 |
| JP | 2010204809 A | 9/2010 |
| JP | 2012073902 A | 4/2012 |
| JP | 2013544461 A | 12/2013 |
| WO | 2009130917 A1 | 10/2009 |
| WO | 2012164721 A1 | 12/2012 |
| WO | 2013025292 A1 | 2/2013 |

OTHER PUBLICATIONS

Thamrin et al., "The Inquiry and Page Procedure in Bluetooth Connection", 2009 International Conference of Soft Computing and Pattern Recognition, p. 218-222, IEEE 978-0-7695-3879-Feb. 2009, Jan. 2009.*

(56) References Cited

OTHER PUBLICATIONS

Menezes et al. (Alfred J. Menezes, Paul C. van Oorschot, Scott A. Vanstone, "Handbook of applied cryptography", 1997, ISBN: 0849385237). (Year: 1997).*
Padgette (Padgette et al., "Guide to Bluetooth Security", NIST Special Publication 800-121 Rev. 1, Jun. 2012), (Year: 2012).*
International Search Report for PCT/US2014/070485 dated Feb. 11, 2015, 4 pages.
Written Opinion for PCT/US2014/070485 dated Feb. 19, 2015, 7 pages.
Notice of Reasons for Rejection for Japanese Application No. 2016-544568, dated Jul. 24, 2018, with translation, 13 pages.
Chinese Office Action for Chinese Application No. 201410843026.2, dated Dec. 19, 2018, with Search Report—16 pages.

\* cited by examiner

AUTHENTICATION APPARATUS WITH A BLUETOOTH INTERFACE

CROSS REFERENCE TO RELATED APPLICATIONS

This application is a continuation of U.S. application Ser. No. 14/571,510 filed Dec. 16, 2014 entitled An Authentication Apparatus With a Bluetooth Interface, which claims priority to U.S. Provisional application Ser. No. 61/921,743 entitled An Authentication Apparatus With a Bluetooth Interface, filed on Dec. 30, 2013, the contents of each are incorporated fully herein by reference.

FIELD OF THE INVENTION

The invention relates to securing remote access to computers and applications and remote transactions over computer networks. More specifically, the invention relates to methods and apparatus for authenticating users to remote application servers using a Bluetooth connection between an authentication device and a host computer.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data have not been altered before being received at an application server.

In the past, application providers have relied on static passwords to provide the security for remote applications. In recent years it has become evident that static passwords are not sufficient and that more advanced security technology is required.

Alternatives to the well-known static-password authentication method should preferably be cost effective, reliable and user convenient.

DISCLOSURE OF THE INVENTION

One aspect of the invention provides an authentication device with a Bluetooth interface for generating a dynamic credential.

In some embodiments the authentication device (100) may be a portable handheld apparatus. In some embodiments the authentication device may comprise: a storage component (130) adapted to securely store a cryptographic credential generation secret key; a user input interface (120) for receiving inputs from a user of the authentication device; a user output interface (110) for presenting outputs to the user; a data processing component (140) adapted to generate said dynamic credential by cryptographically combining said cryptographic credential generation secret key with a dynamic variable; and a Bluetooth interface (150) for connecting the authentication device to a host computer using a Bluetooth connection between the authentication device and said host computer; wherein said authentication device is adapted to send said generated dynamic credential over the Bluetooth connection with said host computer.

In some embodiments the authentication device may be any of the authentication devices of the previous embodiments further comprising: a clock (160) for providing a time value; wherein the authentication device is further adapted to determine a value of said dynamic variable as a function of said time value provided by said clock.

In some embodiments the authentication device may be any of the authentication devices of the previous embodiments further adapted to: store in said storage component a second variable; determine a value of said dynamic variable as a function of said stored second variable; and update and store in the storage component the value of the second variable when the value of the second variable has been used for generating said dynamic credential. In some embodiments said second variable may comprise a counter and updating said second variable may comprise at least one of monotonically increasing (or incrementing) or monotonically decreasing (or decrementing) the value of said counter. For example in some embodiments the dynamic variable may be a counter that the authentication device may store in its memory and that it may increment (or decrement) by one each time that the data processing component of the authentication device generates a dynamic credential.

In some embodiments the authentication device may be any of the authentication devices of the previous embodiments further adapted to receive over said Bluetooth connection a request for said dynamic credential, to generate said dynamic credential (e.g., by the data processing component) in response to said request and to return said generated dynamic credential over said Bluetooth connection. In some embodiments the authentication device may be further adapted to capture, for example after receiving said request, by means of said user input interface an approval from said user to generate or return said dynamic credential prior to generating or returning said dynamic credential. In some embodiments the generation and return of said dynamic credential by said authentication device may be conditional on said user approval.

In some embodiments the authentication device may be any of the authentication devices of the previous embodiments further adapted to receive through said Bluetooth connection a challenge and to use said received challenge in said generating said dynamic credential. In some embodiments the challenge may be contained in a request to generate and return a dynamic credential that the authentication device receives over said Bluetooth connection.

In some embodiments the authentication device may be any of the authentication devices of the previous embodiments further adapted to receive through said Bluetooth connection transaction related data, to present said received transaction related data to the user by said user output interface, to capture by said user input interface an approval of said user of said transaction related data and to use said received transaction related data in said generating said dynamic credential. In some embodiments the generation and return of said dynamic credential by said authentication device may be conditional on said user approval of said transaction related data. In some embodiments the transaction related data may include transaction data that represent a transaction that a user has requested an application to perform.

In some embodiments the authentication device may be any of the authentication devices of the previous embodiments further adapted to store a device identification data element and to make said device identification data element available to said host computer over said Bluetooth connection.

In some embodiments the authentication device may be any of the authentication devices of the previous embodiments further adapted to store a username and make said username available to said host computer over said Bluetooth connection. In some embodiments the authentication device may be further adapted to receive said username over said Bluetooth connection and to store said username for later retrieval over said Bluetooth connection.

In some embodiments the authentication device may be any of the authentication devices of the previous embodiments further adapted to make available an application state to said host computer over said Bluetooth connection.

In some embodiments the authentication device may be any of the authentication devices of the previous embodiments further adapted to send over said Bluetooth connection to said host computer one or more commands to be executed by said host computer.

In some embodiments the authentication device may be any of the authentication devices of the previous embodiments further adapted to verify a PIN and/or password. In some embodiments the authentication device may be further adapted to capture said PIN and/or password provided to the authentication device through said user input interface. In some embodiments the authentication device may be further adapted to receive said PIN and/or password over said Bluetooth connection. In some embodiments the authentication device may be further adapted to generate said dynamic credential only if said verification of said PIN and/or password was successful.

In some embodiments the authentication device may be any of the authentication devices of the previous embodiments further adapted to store biometric reference data and to verify a biometric measurement of said user. In some embodiments the authentication device may further comprise a biometric sensor and may be further adapted to capture said biometric measurement with said biometric sensor. In some embodiments the authentication device may be further adapted to receive said biometric measurement over said Bluetooth connection. In some embodiments the authentication device may be further adapted to generate said dynamic credential only if said verification of said biometric measurement was successful.

In some embodiments the authentication device may be any of the authentication devices of the previous embodiments wherein said user input interface consists of a single button and wherein said authentication device is further adapted to capture an approval of said user by said user pressing said button. In other embodiments the authentication device may be any of the authentication devices of the previous embodiments wherein the user input interface consists of two buttons wherein said authentication device is further adapted to capture an approval of said user by said user pressing a first of said two buttons and to capture a rejection or cancel of said user by said user pressing a second of said two buttons.

In some embodiments the authentication device may be any of the authentication devices of the previous embodiments further adapted to receive or send over said Bluetooth connection application messages over said Bluetooth connection that are secured by a secure messaging technique for protecting the integrity, confidentiality or authenticity of said application messages, whereby the authentication device is further adapted to support said secure messaging technique and to perform cryptographic secure messaging operations that are used in said secure messaging technique whereby said secure messaging technique is independent from any Bluetooth secure messaging mechanism. In some embodiments the authentication device may be further adapted to store a secure messaging secret and to use said secure messaging secret to determine the value of a cryptographic secure messaging key and to use said cryptographic secure messaging key in said cryptographic secure messaging operations.

In some embodiments the authentication device may be any of the authentication devices of the previous embodiments wherein said cryptographically combining said cryptographic credential generation secret key with said dynamic variable comprises executing a symmetric cryptographic algorithm parameterized with said cryptographic credential generation secret key. In some embodiments said symmetric cryptographic algorithm may comprise a symmetric encryption or decryption algorithm. In some embodiments said symmetric cryptographic algorithm may comprise a keyed hashing algorithm.

In some embodiments the authentication device may be any of the authentication devices of the previous embodiments wherein said Bluetooth interface supports Bluetooth Low Energy.

Another aspect of the invention provides a system for securing an interaction between an application and a user. The application may include a server part and a client part. In some embodiments the system may comprise: an application server (210) hosting the server part of the application; a host computer (230) running a client application that is the client part of said application and allowing the user (290) to remotely access the application over a computer network (250), said host computer comprising a user input interface to receive inputs from the user and a user output interface to provide outputs to the user; an authentication device (240) for generating a-dynamic credential, the authentication device comprising a storage component (130) adapted to securely store a cryptographic credential generation secret key, a data processing component (140) for generating said dynamic credential by cryptographically combining said cryptographic credential generation secret key with a dynamic variable, and a Bluetooth interface (150) for connecting the authentication device to said host computer using a Bluetooth connection between the authentication device and said host computer; and a verification server (220) for verifying the validity of said dynamic credential; whereby said host computer is adapted to set up a Bluetooth connection with said authentication device; said authentication device is adapted to generate said dynamic credential and to return said dynamic credential via the Bluetooth connection to said host computer; said client application on the host computer is further adapted to receive said dynamic credential via said Bluetooth connection and to forward said generated dynamic credential to said verification server for verification; and said verification server is adapted to verify the generated dynamic credential and to signal to said application server whether the dynamic credential has been verified to be valid.

In some embodiments the system may be any of the systems of the previous embodiments wherein said authentication device and said verification server share said cryptographic credential generation secret key and wherein said generation and said verification of said dynamic credential is done using a symmetric cryptographic algorithm using a secret authentication key that is shared between said authentication device and said verification server.

In some embodiments the system may be any of the systems of the previous embodiments wherein said authentication device on the one hand and said verification server or application server on the other hand share one or more secure messaging keys; said application server or said verification server is adapted to generate an application message and to secure said application message with secure messaging techniques using said shared one or more secure messaging keys; said client application is adapted to receive said secured application message and to forward said secure application message to said authentication device over said Bluetooth connection; and said authentication device is adapted to receive over said Bluetooth connection said secured application message and to support said secure messaging keys using said shared one or more secure messaging keys and act upon said secured application message.

In some embodiments the system may be any of the systems of the previous embodiments wherein said authentication device is adapted: to receive over said Bluetooth connection an application message containing a request for the authentication device to generate and return said dynamic credential, and, in response to receiving said application message, to generate said dynamic credential and return said dynamic credential over said Bluetooth connection. In some embodiments said application message may contain a challenge and said dynamic variable may be based on said challenge. In some embodiments said challenge may contain an unpredictable value that is generated by said application server or said verification server. In some embodiments said application message may contain transaction data submitted by said user to said application and said dynamic variable may be based on said transaction data.

In some embodiments the system may be any of the systems of the previous embodiments wherein said authentication device is further adapted to maintain an application state that changes in time and to communicate over said Bluetooth connection information about its present state to said host computer; and wherein said client application is further adapted to receive over said Bluetooth connection said state information from said authentication device and to provide guidelines or instructions to said user on how to deal with said authentication device whereby said guidelines or instructions are a function of said received state information.

In some embodiments the system may be any of the systems of the previous embodiments wherein said authentication device is further adapted to generate commands to be executed by said host computer and to communicate said commands to said host computer over said Bluetooth connection; and wherein said client application is further adapted to receive said commands over said Bluetooth connection from said authentication device and to perform said commands. In some embodiments performing said commands by said host computer may comprise said host computer interacting with said user by said user output interface or said user input interface. In some embodiments performing the commands by the host computer may comprise the host computer requesting the user to provide certain data or certain inputs, the host computer obtaining the data or inputs from the user (e.g. by the user interface of the host computer), and the host computer communicating the obtained data or inputs to the authentication device over said Bluetooth connection.

In some embodiments the system may be any of the systems of the previous embodiments wherein said client application is further adapted to obtain by said user input interface of said host computer a PIN and/or password value from said user and to send said obtained PIN and/or password value over said Bluetooth connection to said authentication device; and wherein said authentication device is further adapted to receive over said Bluetooth connection said PIN and/or password value and to verify said received PIN and/or password value.

In some embodiments the system may be any of the systems of the previous embodiments wherein said host computer further comprises a biometric measurement component adapted to capture a biometric measurement from said user; wherein said client application is further adapted to obtain by said biometric measurement component of said host computer a biometric measurement from said user and to send said obtained biometric measurement component over said Bluetooth connection to said authentication device; and wherein said authentication device is further adapted to receive over said Bluetooth connection said biometric measurement and to verify said received biometric measurement.

In some embodiments the system may be any of the systems of the previous embodiments wherein said client application is further adapted to obtain, when said authentication device is connected to said host computer with said Bluetooth connection, an indication of the distance of said authentication device to said host computer; and wherein said application is adapted to take into account said distance indication when deciding whether to grant, maintain or revoke one or more access rights for said user.

In still another aspect the invention provides a method for securing the interaction of a computer-based application with a user whereby the user operates or carries an authentication device for generating a dynamic credential, whereby the authentication device may comprise a Bluetooth interface for communicating with a Bluetooth host device. In some embodiments the authentication device may be any of the previously described authentication devices. In some embodiments the method may be used with any of the previously described systems.

In some embodiments the method may comprise the steps of: running on a local host computer a client application that is a client part of the application for allowing the user to interact with the application by using a user input interface and a user output interface of the local host computer; setting-up at the local host computer a Bluetooth connection with the authentication device; receiving over said Bluetooth connection from the authentication device the dynamic credential that has been generated by said authentication device by cryptographically combining a dynamic variable with a first cryptographic authentication key stored in said authentication device; and verifying said dynamic credential using a cryptographic algorithm that is parameterized with a second cryptographic authentication key.

In some embodiments the method may be any of the methods of the previous embodiments further comprising the steps of: generating an application message; securing said application by applying secure messaging techniques that are based on a symmetric cryptographic algorithm that is parameterized with at least one symmetric secure messaging key that is shared with said authentication device; and at the host computer sending said application message over said Bluetooth connection to the authentication device.

In some embodiments the method may be any of the methods of the previous embodiments further comprising the steps of: generating an application message comprising a request for the authentication device to generate and return said dynamic credential, and at the host computer sending said application message over said Bluetooth connection to the authentication device, whereby the authentication device may generate and return said dynamic credential over said Bluetooth connection to the host computer in response to the authentication device receiving said application message over said Bluetooth connection. In some embodiments the method may further comprise the steps of: generating a challenge and including said challenge in said application message whereby said dynamic variable is based on said challenge. In some embodiments the method may further comprise the steps of: receiving from said user a request for performing a transaction; including in said application message transaction data representing said transaction; and performing said transaction request if said verifying of said dynamic credential is successful; whereby said dynamic variable may be based on said transaction data included in said application message.

In some embodiments the method may be any of the methods of the previous embodiments further comprising the steps of: receiving at said local host computer over said Bluetooth connection from said authentication device information on the application state of the authentication device; providing at the local host computer by said user output interface guidelines or instructions concerning the operation of said authentication device to the user; whereby said guidelines or instructions may be a function of said received information on the application state of the authentication device.

In some embodiments the method may be any of the methods of the previous embodiments further comprising the steps of receiving at said local host computer over said Bluetooth connection from said authentication device a command to be performed and performing said command at said local host computer.

In some embodiments the method may be any of the methods of the previous embodiments further comprising the steps of obtaining at said local host computer a PIN and/or password value from said user by said user input interface and sending said obtained PIN and/or password value over said Bluetooth connection to said authentication device for said PIN and/or password value to be verified by said authentication device.

In some embodiments the method may be any of the methods of the previous embodiments further comprising the steps of obtaining at said local host computer a biometric measurement from said user by a biometric sensor and sending said obtained biometric measurement over said Bluetooth connection to said authentication device for said biometric measurement to be verified by said authentication device.

In some embodiments the method may be any of the methods of the previous embodiments further comprising the steps of obtaining at the local host computer a distance indicating value that is indicative of the actual distance between the local host computer and the authentication device and using said distance indicating value in determining whether to grant, maintain, or revoke one or more access rights to the user In some embodiments the method may be any of the methods of the previous embodiments further comprising at least the steps of: running on a local host computer a client application that is a client part of the application for allowing the user to interact with the application by using a user input interface and a user output interface of the local host computer; setting-up at the local host computer a Bluetooth connection with the authentication device; obtaining at the local host computer a distance indicating value that is indicative of the actual distance between the local host computer and the authentication device; and using said distance indicating value in determining whether to grant, maintain, or revoke one or more access rights to the user. In some embodiments the method may further comprise the steps of comparing said distance indicating value to a predefined threshold value and revoking at least some of said one or more access rights to the user if said comparing indicates that the authentication device is farther from the host computer than the distance associated with said threshold value. In some embodiments the method may further comprise the steps of comparing said distance indicating value to a predefined threshold value and granting at least some of said one or more access rights to the user if said comparing indicates that the authentication device is closer to the host computer than the distance associated with said threshold value.

In some embodiments the authentication device may be an autonomous battery-powered device. In some embodiments the batteries may be rechargeable. In some embodiments the batteries may be replaceable. In some embodiments the authentication device may be a pocket-size, portable and handheld device.

In some embodiments the authentication device may have its own user output interface which for example may comprise a display. In some embodiments the authentication device may have its own user input interface which for example may comprise a keypad. In some cases the keypad may be reduced to a single button, in other case the keypad may consist of two buttons, in still other cases the keypad can be a full keyboard.

In some embodiments the user input interface and the user output interface may be non-removable and not user-serviceable, fully controlled by the authentication device, and immune from interference by malicious software on a host computer. In such embodiments the authentication device can therefore be considered to have a trustworthy user interface in contrast to, for example, PCs where there is always the possibility that malicious software such as a virus or a Trojan presents fake messages to the user, or captures whatever the user enters on the keypad, or reads in memory sensitive data associated with a security application or alters data before they are being signed.

In some embodiments the firmware of the authentication device may not be alterable. In some embodiments the authentication device may have tamper evident provisions. In some embodiments the authentication device may be a dedicated secure hardware device dedicated to providing authentication and/or transaction signature functions. In some embodiments the main purpose of the authentication device is to generate dynamic credentials which in some cases may be referred to as 'One-Time Passwords' (OTPs) or dynamic passwords.

In some embodiments the authentication device may be adapted to generate these dynamic credentials by cryptographically combining a secret with the value of a dynamic variable.

In some embodiments this secret may be a cryptographic secret key securely stored in the authentication device. In some embodiments the authentication device may use the secret to parameterize a cryptographic algorithm that uses the dynamic variable as an input. In some embodiments the secret may comprise a secret value that is shared between the authentication device and a verification or authentication server. In some embodiments the secret may comprise a symmetric secret key. In some embodiments the secret may comprise a private key of a public-private key pair. In some embodiments the secret of each particular authentication device may have its own individual or unique value.

In some embodiments the dynamic variable may be derived from or based on a time value, a counter value or a server challenge that is provided to the device, or a combination of these. In some embodiments the authentication device can also use data (such as transaction data) that have been provided to the device as the dynamic value or the device may use these data in combination with any of the dynamic values mentioned above to generate a dynamic credential. In cases where the dynamic variable is based on transaction data, the resulting dynamic credential may be meant to indicate the user's approval of the data and the dynamic credential may be referred to as an electronic signature or Message Authentication Code (MAC). For example in some embodiments the authentication device may cryptographically combine a cryptographic secret with a time value and transaction data to generate a dynamic credential comprising an electronic signature over the transaction data.

In some embodiments the authentication device cryptographically combining the secret with a dynamic variable may comprise the authentication device performing a symmetric cryptographic algorithm. In some embodiments this symmetric cryptographic algorithm may take the dynamic variable as an input and may be parameterized with the secret securely stored in the device. In some embodiments the symmetric cryptographic algorithm may comprise a symmetric encryption or decryption algorithm (such as for example DES, 3DES or AES) over data related to the dynamic value and using the secret as a symmetric encryption or decryption key. In some cases the authentication device cryptographically combining the secret with a dynamic value may comprise performing a cryptographic hash function (such as for example SHA-1) that is keyed with the secret and using the data related to the dynamic value as input data to the hash function. In some embodiments the secrete that the authentication device uses to generate the dynamic credential may be shared with the application or a verification server that verifies the dynamic credential on behalf of the application, whereby the application or verification server may use the shared secret in verifying the dynamic credential generated by the authentication device.

In some embodiments the secret may itself be a dynamic variable. For example in some embodiments when the secret is used to generate a dynamic credential, its value may be replaced by a new value that is a function of the old value (the new value of the secret may for example be calculated as a one-way hash value of the old value). Since in such embodiments the value of the secret can be determined as a function of the initial value of the secret and the number of times the secret value has been changed, such embodiments are mathematically equivalent to using a static secret in combination with a dynamic variable comprising a counter value.

In some embodiments the dynamic variable that the authentication device may use to generate a dynamic credential may be based on the value of an external variable (such as a challenge or transaction data) that is provided to the authentication device by some entity that is external to the authentication device. In some embodiments the dynamic variable that the authentication device may use to generate a dynamic credential may be based on the value of an internal variable that is provided by the authentication device itself, such as for example the time value of a clock comprised in the authentication device or the value of a counter stored in an updated by the authentication device. In some embodiments the dynamic variable may be based on both an external variable and an internal variable.

In some embodiments the authentication device may be capable of communicating with an inserted smart card whereby the generation of the dynamic credentials is partly done by the authentication device itself and partly by the inserted smart card.

In some embodiments the authentication device may be adapted to receive data (such as a server challenge or transaction data) that it may use for generating dynamic credentials by the user providing data to the authentication device by the authentication device's user input interface. For example in some embodiments the user may enter the data manually on the authentication device's keypad. When the amount of data that has to be provided by the user to the authentication device in this way exceeds a few dozen characters, this process may be perceived by users as too cumbersome.

In some embodiments the authentication device may be adapted to present a generated dynamic credential to the user by the human output interface so that the user may provide or forward the presented dynamic credential to the system that needs to verify this dynamic credential. For example in some embodiments the authentication device may be adapted to display a generated OTP or MAC on its display so that the user may copy the displayed OTP or MAC into his or her PC (or other internet access device) which may transmit this OTP or MAC to the application or authentication server where the validity of the OTP or MAC can then be verified. This however also requires some actions from the user that may be perceived as inconvenient.

In some embodiments the authentication device may comprise a Bluetooth interface. In some embodiments the authentication device's Bluetooth interface may be used to connect the authentication device to a host computer that supports Bluetooth. The host computer may be an access device that the user uses to interact (e.g. over a public telecommunications network such as the internet) with an application (which may be a remotely accessible application). In some embodiments the authentication device may be adapted to exchange data with a host computer using the Bluetooth interface of the authentication device.

In some embodiments the authentication device may be adapted to receive data over its Bluetooth interface. In some embodiments the authentication device may be adapted to receive data over its Bluetooth interface that it may use to generate a dynamic credential. For example in some embodiments the authentication device may receive a server challenge and/or transaction data from a host computer over its Bluetooth interface and the authentication device may use this challenge and/or transaction data to generate a dynamic credential. In some embodiments the authentication device may be adapted to return a dynamic credential that it generated to a host computer over its Bluetooth interface. In some embodiments the Bluetooth interface may support Bluetooth Low Energy (BLE).

In some embodiments the authentication device may be used to secure the interaction of a user with an application as follows.

In some embodiments the user may use the host computer as an access device to interact with a computer-based application. In some embodiments the host computer may for example comprise a PC (Personal Computer), a tablet, or a smartphone. In some embodiments the host computer may run an operating system such as for example Windows 8, Android, or iOS.

During the interaction with the application the application may require the user to supply a dynamic credential. For example in some embodiments a user may have to provide during the login procedure a valid dynamic credential to the application for the application to verify and the application may grant the user access only if this verification was successful. For example in some embodiments the user may submit a transaction to the application (for example the user may submit a money transfer transaction to an Internet banking application) whereupon the application may require the user to supply a dynamic credential comprising an electronic signature over the transaction data.

In some embodiments the dynamic credential may be generated by the user's authentication device. In some embodiments data exchange between the application and the authentication device may be done over the Bluetooth interface of the authentication device. In some embodiments the authentication system (that may be part of the application or that may be used by the application) may comprise a client authentication application on the host computer for interfacing with the authentication device, e.g. using the Bluetooth interface of the authentication device.

In some embodiments the application may be computer-based. In some embodiments the application may comprise a client application that comprises application software components running on a computer that the user may be interacting with. The client application may be adapted to interact with the user through a user input interface (such as a mouse and/or keyboard and/or touch screen) and/or a user output interface (such as loudspeakers and/or a display) of a computer the client application is running on. In some embodiments the application may comprise one or more server based components. In some embodiments the application may comprise server parts comprising software running on server computers that may be connected to and interact with a computer running a client application. The server computers and the computer running the client application may be connected with each other by a computer network such as for example the Internet. Actions that are described in this description as being performed by a host computer may, at least in some embodiments, be performed by the host computer under impulse and control of the client application running on that host computer.

In some embodiments the authentication device may exchange messages with a server based component of the application. In some embodiments messages that are exchanged between a server-based component of the application and the authentication device may be protected with secure messaging techniques. In some embodiments the integrity of at least some of the data of at least some messages exchanged between a server-based component of the application and the authentication device may be protected using secure messaging techniques. In some embodiments the confidentiality of at least some of the data of at least some messages exchanged between a server-based component of the application and the authentication device may be protected using secure messaging techniques. In some embodiments the authenticity of the entity sending at least some messages exchanged between a server-based component of the application and the authentication device may be protected using secure messaging techniques.

In some embodiments at least some of the data of at least some messages exchanged between a server-based component of the application and the authentication device may be encrypted, e.g. to protect or guarantee the confidentiality, integrity or authenticity of the data in the messages. In some embodiments this encryption may be done using a symmetric encryption algorithm, such as e.g. AES (Advanced Encryption Standard), that may be parameterized with a symmetric secret key that may be shared between the authentication device and the server-based application component.

In some embodiments at least some messages exchanged between a server-based component of the application and the authentication device may comprise a MAC (Message Authentication Code) over at least some of the data comprised in such a message, e.g. to protect or guarantee the integrity or authenticity of the data in the messages. In some embodiments such MACs may be generated and or verified using a symmetric cryptographic algorithm, such as a symmetric encryption or decryption algorithm, e.g. AES (Advanced Encryption Standard), or some keyed hashing algorithm such as HMAC, that may be parameterized with a symmetric secret key that may be shared between the authentication device and the server-based application component.

In some embodiment each individual authentication device of a plurality of authentication devices may store a different set of one or more secure messaging secrets that the authentication device may use to determine the values of one or more secure messaging keys that the authentication device may use to parameterize the cryptographic algorithms of the secure messaging techniques described above. In some embodiments a server may store one or more secrets that may allow the server to determine for a given authentication device the secure messaging secrets to be used with that authentication device. In some embodiments the server may store one or more secure messaging master keys that the server may use with for example a data element that has a unique value for each individual authentication device (e.g. a serial number of the authentication device) to derive the values of the secure messaging keys for that authentication device. In some embodiments the server may store in a database for each authentication device the secure messaging secrets stored in that authentication device associated with a device identifying data element (e.g. a serial number) of the authentication device.

In some embodiments the Bluetooth interlace is always active when the authentication device is active. In some embodiments the user may turn on the authentication device (e.g. by pressing a button) and when the authentication device turns on it may also enable its Bluetooth interface. In some embodiments the user may have to explicitly instruct the authentication device to enable the Bluetooth interface e.g. by pressing a button.

In some embodiments the Bluetooth interface of the authentication device may advertise/announce its presence (e.g., by transmitting a message) when the Bluetooth interface of the authentication device has been activated. In some embodiments the authentication device may be configured to advertise its presence over the Bluetooth interface only during a limited period of time (e.g. for a period of less than 5 minutes). In some embodiments the authentication device supports the Bluetooth Limited Discoverable mode. In some embodiments the authentication device supports the Bluetooth General Discovery mode. In some embodiments the authentication device may remain in some discovery mode during a limited period of time and may thereafter for example turn itself off.

In some embodiments when a component of the host computer (for example the client authentication application) notices that an authentication device with an active Bluetooth is present, it may initiate a Bluetooth connection with the authentication device.

In some embodiments the authentication device is adapted to support a Bluetooth pairing mechanism with the host computer. In some embodiments the authentication device is adapted to support a Bluetooth Low Energy pairing mechanism. In some embodiments the authentication device is adapted to support pairing with Bluetooth Low Energy clients with the Passkey Entry pairing method. In some embodiments the authentication device may be adapted to receive a Bluetooth pairing request and upon receiving the pairing request the authentication device may generate a pairing code and display the generated pairing code to the user and the user may provide the displayed pairing code to the host computer (e.g. to the client authentication application). In some embodiments the authentication device may be configured so that the number of digits or characters in the pairing code may be different than the number of digits or characters in a dynamic credential generated by the authentication device.

Once a Bluetooth connection is established between the host computer and the authentication device, a component on the host computer (e.g. the client authentication application) may use the Bluetooth connection to send a request to the authentication device for a dynamic credential. In some embodiments the authentication device may be adapted to receive by the Bluetooth interface of the authentication device such a request for generating a dynamic credential. In some embodiments, upon receiving the request for generating a dynamic credential the authentication device may request the user to confirm to go ahead with the generation of the requested dynamic credential (e.g. by pressing a button).

In some embodiments the authentication device may not need any other external data for the generation of the dynamic credential and may now proceed with the generation of the dynamic credential. For example the authentication device may generate the dynamic credential using the secret and a dynamic variable that may be based on a time value generated by a clock in the authentication device or that may be based on a counter value that the authentication device may store in its memory and that the authentication device increments each time it generates a dynamic credential.

In some embodiments the authentication device may generate the dynamic credential using a dynamic variable that is based on a challenge generated by the application. In some embodiments the challenge may be generated by a server part of the application and may be communicated to the client application and the client application may forward the challenge to the authentication device over the Bluetooth connection. In some embodiments the client application may generate the challenge, may send the challenge to the authentication device over the Bluetooth connection and may communicate the challenge to the server part of the application (for example together with the response of the authentication device to the challenge). In some embodiments the authentication device may receive this challenge over the Bluetooth connection. In some embodiments the authentication device may receive the challenge as part of the request to generate a dynamic credential. In other embodiments the authentication device may receive the challenge as part of another message.

In some embodiments the authentication device may generate the dynamic credential using a dynamic variable that is based on transaction data. In some embodiments the authentication device may receive these transaction data over the Bluetooth connection. In some embodiments the authentication device may receive these transaction data as part of the request to generate a dynamic credential. In other embodiments the authentication device may receive these transaction data as part of another message (or as part of multiple other messages). In some embodiments the authentication device may present the received transaction data to the user and may request the user to approve these data on the authentication device before generating the dynamic credential. In some embodiments the transaction data may be divided in parts (e.g. in data fields) and each part may be presented to and approved by the user separately. In some embodiments the authentication device may have a user input interface that is adapted to capture an approval of the user of the transaction data. In some embodiments the authentication device may have a button that the user may press to approve the transaction data. In some embodiments if the user approved all parts of the transaction data the authentication device may generate a dynamic credential by cryptographically combining the secret with a dynamic variable based on these approved transaction data. In some embodiments the dynamic variable may also be based on for example a time value that may be provided by a clock comprised in the authentication device. In some embodiments not all transaction data may be presented to the user and approved by the user on the authentication device and the dynamic variable may be based on transaction data that have been presented to and approved by the user on the authentication device as well as data that have not been presented to and approved by the user on the authentication device.

In some embodiments the authentication device may also generate a dynamic credential in response to another event than receiving a message of the host computer over the Bluetooth connection with that host computer. For example in some embodiments the authentication device may generate a dynamic credential in response to a user action captured by the authentication device, such as for example the user pressing a button of the user input interface of the authentication device. In some embodiments the authentication device may use its user output interface to present the generated dynamic credential to the user. In some embodiments the authentication device may push the generated dynamic credential to the host computer using the Bluetooth connection between the host computer and the authentication device.

In some embodiments when the authentication device has generated the dynamic credential, which may be in response to receiving a Bluetooth message or in response to another event, it may use the Bluetooth connection to send the generated dynamic credential to the host computer. In some embodiments the authentication device may display the generated dynamic credential to the user before sending the generated dynamic credential to the host computer. In some embodiments the authentication device may request the user to confirm to send the generated dynamic credential to the host computer. In some embodiments the user may confirm to send the generated dynamic credential to the host computer by pressing a button of the authentication device.

In some embodiments the user input interface of the authentication device has one single button for actuation by a human user. In some embodiments the user may press this single button for example to turn on the authentication device and/or to activate the Bluetooth interface and/or to approve transaction data and/or to confirm that a dynamic credential should be generated and/or sent to the host computer. In some embodiments to enable the user to cancel an operation or to disapprove data presented to the user or to turn off the device, the authentication device may set a time-out period and if the user hasn't pressed the single button before the time-out period expires, the authentication device may interpret this as a cancel, disapproval or turn-off.

In some embodiments the user input interface of the authentication device may have exactly two buttons for actuation by a human. In some embodiments a first button of the user input interface may be used by the user to turn on the authentication device and/or to activate the Bluetooth interface and/or to approve transaction data and/or to confirm that a dynamic credential should be generated and/or sent to the host computer, and a second button may be used to turn off the authentication device and/or to de-activate the Bluetooth interface and/or to reject transaction data and/or to reject that a dynamic credential should be generated and/or sent to the host computer.

In some embodiments the authentication device may be adapted to also provide a device identification data element to the host computer over the Bluetooth connection. Each particular authentication device may have a different unique value for this device identification data element so that the value of this device identification data element may be used to identify the particular authentication device that for example generated the dynamic credential. In some embodiments the authentication device may return its device identification data element in response to a specific request of the host computer. In some embodiments the authentication device may return its device identification data element together with a generated dynamic credential (in the same or in another message). In some embodiments the device identification data element may be provided to the host computer during the connection set-up e.g. as (part of) a friendly Bluetooth name or a Device Name or a Bluetooth address. In some embodiments the authentication device may provide a device identification data element as part of a Bluetooth advertisement message. In some embodiments this may be used by a host computer as follows. If a host computer detects the presence of multiple authentication devices that are advertising their presence, the host computer may use the device identification data elements in the advertising messages to select the authentication device with which it wants to set up a Bluetooth connection. For example, the host computer may select the authentication device with a device identification data element that corresponds to the device identification data element of an authentication device that has already been used previously with that host computer. In case multiple authentication devices have been used previously with that host computer, the host computer may for example choose the authentication device that has been used most recently or alternatively the authentication device that has been used most often in the past.

In some embodiments the client application on the host computer may obtain a user identifier such as a username from the user using the authentication device and may use that user identifier to determine a list of one or more authentication devices associated with that user. For example the client application may send the user identifier to a server part of the application and may receive in return from the server part a list of one or more authentication device identifiers. The client application may then verify which of the multiple authentication devices that are advertising their presence is in that list and select an authentication device that is in that list.

In some embodiments when a component on the host computer (e.g. the client authentication application) has received from the authentication device the device identification data element of that authentication device, the host computer may forward the received device identification data element to the application server. In some embodiments the device identification data element value of the authentication device of a particular user may be associated at the server side with that particular user. For example the user id and/or user name of each user may be associated in a database of the server with the device identification data element value of the authentication device assigned to that user. In some embodiments, upon receiving the device identification data element value of a particular authentication device the server may look-up the associated user id and/or user name. In some embodiments this may avoid the need for the user to actively have to provide a user name to be identified when for example logging in.

In some embodiments the authentication device may support a white list of host computers (e.g. in the form of a list of Bluetooth addresses of hosts computers). In some embodiments such a white list may contain the host computers that are allowed to set-up a Bluetooth connection with the authentication device. If a host computer tries to establish a Bluetooth connection with the authentication device, the authentication device may verify whether that host computer is included in that white list and if the host computer is indeed included in that white list the authentication device may accept the connection attempt. In some embodiments the authentication device may refuse the connection attempt of a host computer that is not in the white list of the authentication device. In some embodiments the authentication device may support a mechanism to add or remove host computers to or from the white list of the authentication device. In some embodiments an authentication device may support commands that may be issued by an application to add or remove host computers to or from the white list of the authentication device. In some embodiments such commands may be secured by a secure messaging mechanism as explained elsewhere in this description in more detail, for example to ensure the authenticity and/or integrity of the commands. In some embodiments when a host computer attempts to set-up a Bluetooth connection with the authentication device and the host computer is not in the white list of the authentication device, the authentication device may request the user to confirm whether or not to accept the connection and/or whether to include the host computer in the white list.

In some embodiments an authentication device may be manufactured with an initial built-in white list of acceptable host computers. In some embodiments such a built-in initial white list may comprise the host computers that at a later stage may be used to load personalization and configuration data into the authentication device. In some embodiments the initial white list may be removed, replaced by another white list, and/or updated during a later stage such as a personalization and/or configuration stage.

In some embodiments the user may also be requested to provide an extra static password to the application on top of the dynamic credential generated by the authentication device. This provides two-factor authentication: something you know (the static password) and something you have (the particular authentication device associated with the user, possession of which is demonstrated by the user's ability to provide a correct dynamic credential to the application).

In some embodiments the authentication device may have a user input interface that is adapted to capture a PIN and/or password value that is provided by the user. In some embodiments the authentication device may be adapted to receive a PIN (Personal Identification Number) and/or password value over the Bluetooth connection from the host computer. In some embodiments the client application running on the host computer may request the user to enter a PIN and/or password value on the user input interface of the host computer and may forward that PIN and/or password value to the authentication device over the Bluetooth connection that has been set up between the host computer and the authentication device. In some embodiments the authentication device may be adapted to verify a PIN and/or password value that it has received over the Bluetooth connection or that it has received from the user via the user input device of the authentication device. In some embodiments the authentication device may be adapted to store a PIN and/or password reference value and may verify the received PIN and/or password value by comparing the received value with the stored reference value. In some embodiments a successful PIN and/or password verification may be a condition for the authentication device to generate a dynamic credential. I.e. in some embodiments the authentication device may generate a dynamic credential only if a PIN and/or password has first been provided to the authentication device and has been successfully verified by the authentication device.

In some embodiments the authentication device may have a biometric sensor to capture a measurement of some biometric of the user. For example in some embodiments the authentication device may have a fingerprint sensor. In some embodiments the authentication device may be adapted to receive over a Bluetooth connection with a host computer a measurement of some biometric of the user that may have been obtained by the host computer. In some embodiments the authentication device may store biometric reference data for a user. In some embodiments the authentication device may be adapted to compare a measurement of a biometric of the user (which the authentication device may have captured using a biometric sensor of the authentication device or which the authentication device may have received from the host computer) with biometric reference data stored in the authentication device. In some embodiments success of such a comparison may be a condition for the authentication device to generate a dynamic credential. I.e. in some embodiments the authentication device may generate a dynamic credential only if a measurement of a biometric of the user has first been provided to the authentication device and has been successfully compared by the authentication device to biometric reference data stored in the device.

In some embodiments when a component on the host computer (e.g. the client authentication application) has received from the authentication device the dynamic credential generated by the authentication device, the host computer may forward the received dynamic credential to the application server or some dynamic credential verification server. Upon receiving the forwarded dynamic credential the application server of verification server may verify the received dynamic credential. Upon successful verification of the dynamic credential the application server may take appropriate action such as logging in the user or giving the user access to a certain resource or certain information or accepting a transaction submitted by the user.

In some embodiments the Bluetooth connection may also be used to provide personalized data to the authentication device, such as for example data associated with the user that the authentication device is associated with (e.g. a user name) or extra secret data such as cryptographic keys.

In some embodiments the authentication device may be adapted to store one or more user names of the user that is associated with the authentication device. In some embodiments a client application on a host computer that is connected by a Bluetooth connection with the authentication device may read one of the user names stored in the authentication device using the Bluetooth connection. In some embodiments a client application can also write a user name into the authentication device using the Bluetooth connection.

In some embodiments the capability of an authentication device to store a user name may be used by the application as follows. When the user attempts to login into an application, the application may require a user name and user credentials. The client application on the host computer that the user is using to access the application may set-up a Bluetooth connection with the user's authentication device. This may involve the client application instructing or requesting the user to turn on the authentication device. Alternatively, the user may turn on the authentication device upon which the authentication device may use its Bluetooth interface to advertise its presence to the host computer and a Bluetooth connection may be set-up between the host computer and the authentication device and the client application may recognise the authentication device as an authentication device and automatically assume that the user would like to perform a login. The client application may then use the Bluetooth connection to verify whether the authentication device has a user name stored and obtain that user name if indeed the authentication device stores a user name. If the client application was not able to obtain the user name from the authentication device, it may request or instruct the user to manually provide the appropriate user name through the user input interface of the host computer. The client application may use the Bluetooth connection to also obtain a user credential, such as a one-time password or a response to a challenge, from the authentication device. The client application may forward the user name and user credential to the application for verification. If verification was successful, the client application may store the user name that was successfully used into the authentication device using the Bluetooth connection.

In some embodiments the authentication device may be adapted to generate commands and communicate these commands over the Bluetooth connection to the connected host computer whereupon these commands may be executed by the client application on the host computer. For example, in some embodiments the authentication device may use the Bluetooth connection to send a command to the host computer containing a message to be presented to the user, and the client application may receive such a command and present the message contained in the command to the user on the user output interface of the host computer. In some embodiments the message contained in the command may be in the form of a string of characters (for example a string of ASCII or Unicode characters). In some embodiments the message may be contained in the command in the form of a message pointer or reference that the client application may use to determine the actual message to present to the user.

In some embodiments the authentication device may use the Bluetooth connection to send a command to the host computer requesting to return a PIN or password to the authentication device. The client application on the host computer may receive this message and in response may use the user output interface of the host computer to prompt the user to provide a PIN and/or password and the client application may capture the PIN and/or password provided by the user using the user input interface of the host computer and use the Bluetooth connection to send the captured PIN and/or password. In some embodiments the authentication device may use the Bluetooth connection to send a command to the host computer requesting to return biometric measurement of the user to the authentication device. The client application on the host computer may receive this message and in response may use the user output interface of the host computer to prompt the user to provide a biometric and the client application may for example use a biometric sensor (such as a fingerprint sensor) of the host computer to measure the biometric presented by the user and use the Bluetooth connection to send that biometric measurement to the authentication device.

In some embodiments an application may also take into account the mere presence of a Bluetooth enabled authentication device to authenticate a user. For example, in some embodiments a user may be authenticated on the basis only of the Bluetooth detection by a host computer of the authentication device. In some embodiments an application may authorise a user to perform some actions as soon as the presence of the user's authentication device has been detected and may authorise the user to perform other (additional) actions once a dynamic credential generated by the authentication device has been received and successfully verified.

In some embodiments the application may monitor the continued presence of the authentication device. In some embodiments the application may take into account the presence or absence of a user's authentication device when granting or revoking authorizations to that user. For example, in some embodiments after a user has been successfully authenticated, the authorisation that the user may have received in response to that successful authentication (for example to perform certain actions or to have access to certain resources) may be withdrawn when the application detects that the authentication device is no longer present at the host computer. In some embodiments the application may consider the device to be present as long as the Bluetooth connection is maintained. In some embodiments the application may consider the authentication device to be present as long as the authentication device remains within a certain distance of the host computer (whereby the strength of the Bluetooth signal of the authentication device may be used as a proxy for the distance as explained in more detail below). In some embodiments the application may consider the device to be absent when the Bluetooth connection is broken. In some embodiments the application may consider the authentication device to be absent when the authentication device is no longer within a certain minimum distance of the host computer (whereby the strength of the Bluetooth signal of the authentication device may be used as a proxy for the distance as explained in more detail below).

In some embodiments the application may take into account the distance of the authentication device from the host computer. For example in some embodiments the application may only accept a user or requests by the user if the distance of the user's authentication device from the host computer is less than a certain threshold. In some embodiments the application may close a session that the user has set-up using the authentication device, when the application senses that the distance between the authentication device and the host computer has exceeded a certain threshold value. In some embodiments the application may use the strength of the Bluetooth signal emitted by the authentication device as a proxy for the distance between the authentication device and the host computer. In some embodiments the authentication device may take the strength of the signal received from the host computer into account e.g. when deciding to accept a connection attempt or when deciding to accept or reject an incoming application message or command. In some embodiments the RSSI (Received Signal Strength Indicator) of the Bluetooth connection may be used as a measure for the signal strength.

In some embodiments the application may automatically set-up a Bluetooth connection with an authentication device that is in the neighbourhood of a host computer. In some embodiments the application may set-up a Bluetooth connection with the authentication device when the Bluetooth signal strength of the authentication device is better than a certain minimum level. In some embodiments Bluetooth or Bluetooth Low Energy pairing is automatically used for the Bluetooth connection that is set-up. In some embodiments different individual authentication devices may have different pairing keys. In some embodiments the application may retrieve the pairing key to be used for a specific authentication device using a device identifying data element (such as for example a Bluetooth address) of the authentication device. In some embodiments the application may derive the pairing key of the authentication device from the device identifying data element of the authentication device and some master key that is the same for a plurality of authentication devices. In some embodiments the user may provide the pairing key to the application (e.g. at first usage of the authentication device) and the application may store (e.g. in a database) a relation between the pairing key provided by the user and a device identifying data element of the authentication device. In some embodiments, after the Bluetooth connection has been set-up, the application may automatically identify the user of the authentication device (e.g. using a device identifying data element or a user identifier supplied by the authentication device over the Bluetooth connection). In some embodiments the application may authenticate the user. In some embodiments (e.g. if pairing is used with a unique pairing key for each different authentication device) the user may implicitly be considered to be successfully authenticated once the Bluetooth connection has been successfully set-up using pairing. In some embodiments the application may request the authentication device to generate and return (over the Bluetooth connection) a dynamic credential that may then be verified by the application. In some embodiments the user may be required to take some action during the authentication process. For example in some embodiments the user must indicate his or her approval to the authentication device (e.g. by pressing a certain button on the authentication device). In some embodiments the user may be required during the authentication process to provide a static PIN or password that may then be verified by the application. In some embodiments the application may upon successful authentication of the user grant some authorizations to the user (such as granting access to some resources or accepting user application requests such as requests to perform certain actions or transactions). Then the application may monitor whether the authentication device remains present. In some embodiments the application may revoke one or more of the granted authorizations when the application notices that the authentication device is no longer present. In some embodiments if thereafter the application detects that the authentication device is present again (at the same or another host computer), the application may re-grant one or more of the revoked authorizations. In some embodiments if the application detects that the authentication device is present again, the application may re-authenticate the user. In some embodiments re-authenticating the user may be done using an authentication method that may be simpler than an authentication method used for an earlier authentication. For example in some embodiments the simpler authentication method may not require explicit user actions such indicating approval of supplying a static PIN or password, whereas the original or standard authentication method may require such explicit user actions. In some embodiments the application may decide on which type of re-authentication to use (and/or whether re-authentication has to occur at all) based on the time that has elapsed between the moment of re-authentication and some reference event such as a prior authentication or when the application noticed the authentication device was no longer present.

For example in some embodiments a user may be granted certain authorizations at some host computer as soon as the application detects the presence of the user's authentication device at the host computer and these authorizations may be revoked when the application detects that the user's authentication device is no longer present. This mechanism may for example be used to secure access by medical staff at computers in a hospital to patients' medical files or to secure physical access to physical locations by doors unlocking and relocking depending on the presence of authentication devices of users at the doors.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
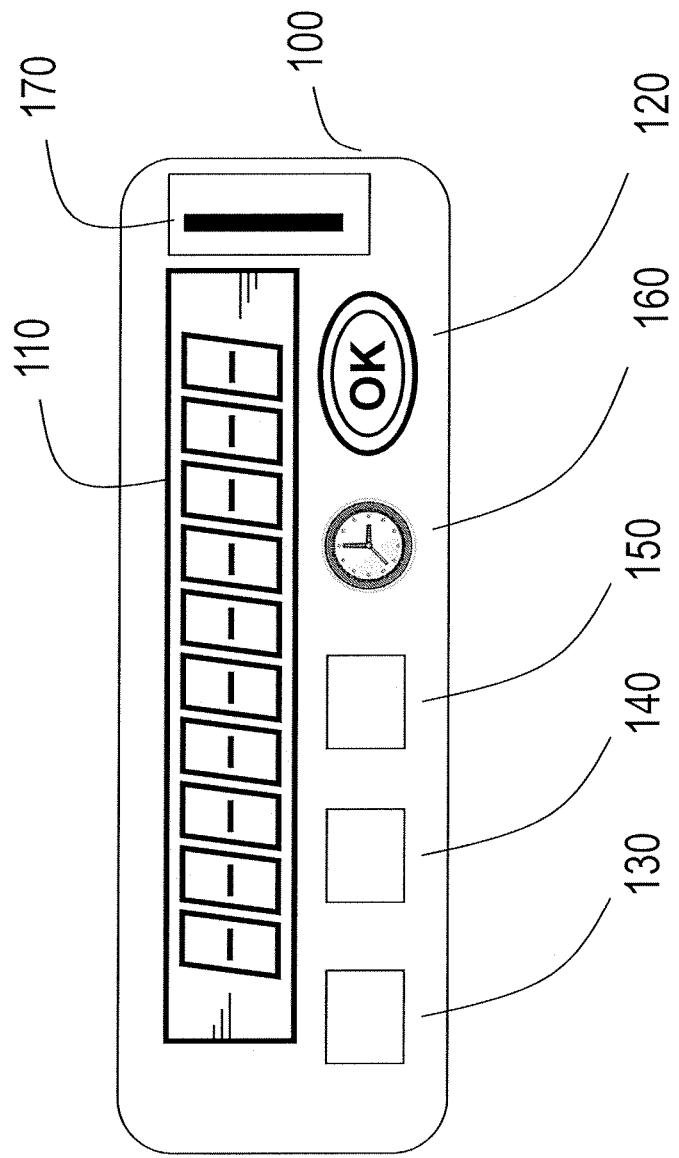
FIG. 1 schematically illustrates an exemplary apparatus according to an aspect of the invention.

FIG. 1 schematically illustrates an exemplary apparatus of the invention according to an aspect of the invention.

In some embodiments the apparatus comprises an authentication device (100) for generating a dynamic credential that may comprise: a storage component (130) adapted to securely store a cryptographic secret; a user input interface (120) for receiving inputs from a user of the authentication device; a user output interface (110) for presenting outputs to the user; a data processing component (140) adapted to generate said dynamic credential by cryptographically combining said cryptographic secret key with a dynamic variable; and a Bluetooth interface (150) for connecting the authentication device to a host computer; wherein said authentication device is adapted to send said generated dynamic credential to said host computer. In some embodiments the authentication device may also comprise a clock (160). In some embodiments the authentication device may also comprise a biometric sensor (170).

In some embodiments the user output interface (110) may comprise a display such as a Liquid Crystal Display (LCD). In some embodiments the user output interface may comprise a loudspeaker. In some embodiments the user output interface may comprise a speech synthesis component. In some embodiments the user output interface (110) may be adapted to present to the user data, such as for example transaction data to be approved for the user. In some embodiments the user output interface may be adapted to present to the user a generated dynamic credential. In some embodiments the generated dynamic credential may be presented by the authentication device to the user as a string of digits or characters. In some embodiments the string of digits may consist of a string of numerical digits. In some embodiments the string of characters may consist of a string of alphanumerical characters. In some embodiments the user output interface may consist of a display that is limited to displaying a single line of characters to the user. In some embodiments the user output interface may consist of a display that is limited to displaying two lines of characters to the user. An authentication device with a display that is limited to displaying only a single or two lines to the user may have a very compact form factor.

In some embodiment the user input interface (120) may comprise a keyboard. In some embodiments the user input interface may consist of a single button. In some embodiments the user input interface may consist of exactly two buttons: one button may for example be used for indicating user approval while the other button may for example be used by the user to reject data or cancel an operation. In some embodiments the user may turn on the device by pressing the two buttons simultaneously or one quickly after the other (e.g. with a time interval between the two presses of less than 2 seconds). In some embodiments the user input interface may be adapted to capture an approval of the user. In some embodiments the user input interface may be adapted to capture a rejection of the user. In some embodiments the user input interface may be adapted to capture the value of a PIN or password provided by the user to the authentication device.

In some embodiments the storage component (130) may for example comprise ROM, EEPROM, Flash or RAM memory. In some embodiments the storage component may be adapted to securely store cryptographic secrets and/or cryptographic keys that the authentication device may use for example in generating a dynamic credential or to support secure messaging techniques when receiving or generating application messages that are protected by secure messaging. In some embodiments the storage component may be adapted to store PIN and/or password reference data. In some embodiments the storage component may be adapted to store biometric reference data. In some embodiments the storage component may be adapted to store a dynamic variable the value of which may be updated by the authentication device e.g. every time the authentication device uses the stored dynamic variable to generate a dynamic credential.

In some embodiments the data processing component (140) may for example comprise one or more microprocessors, controllers (e.g. to handle the input and output interfaces), FPGAs (Field Programmable Gate Arrays) and/or ASICs (Application Specific Integrated Circuits). In some embodiments the data processing component may be adapted to perform cryptographic algorithms. In some embodiments the data processing component may be adapted to generate dynamic credentials. In some embodiments the data processing component may be adapted to generate a dynamic credential by cryptographically combining a secret (which may for example be stored in the storage component (130)) with a dynamic variable. In some embodiments the dynamic variable may be based on the value of an internal variable such as a time value provided by a clock of the authentication device, or such as a counter-related value that may be stored in the storage component (130). In some embodiments the dynamic variable may be based on an externally generated value, such as for example a challenge or transaction data, that may be provided to the authentication device e.g. over a Bluetooth connection. In some embodiments the data processing component may be adapted to verify a PIN and/or password value e.g. by comparing it to PIN and/or password reference data that may be stored in the storage component (130). In some embodiments the data processing component may be adapted to verify a measurement of a biometric of the user e.g. by comparing it to biometric reference data that may be stored in the storage component (130).

In some embodiments the Bluetooth interface (150) may be of the Bluetooth Low Energy or Bluetooth LE type. In some embodiments the Bluetooth interface may be compatible with the Bluetooth Core Specification Version 4.0, which is incorporated herein by reference. In some embodiments the Bluetooth interface may support Peripheral (Slave) role operation. In some embodiments the authentication device may work as a Bluetooth Generic Access Profile (GAP) Peripheral and may be a Bluetooth LE slave and/or Generic Attribute Profile (GATT) server.

In some embodiments the Bluetooth interface supports Bluetooth Pairing. In some embodiments the authentication device may support pairing with multiple host computers and may store pairing information for multiple host computers. In some embodiments the authentication device may support pairing with at most a single host computer and may store pairing information for only a single host computer. In some embodiments, if the authentication device has been paired, the authentication device may only allow a new pairing if an existing pairing is first explicitly removed. In some embodiments the authentication device may be adapted to allow the user to indicate that an existing pairing must be removed.

In some embodiments, when the authentication device's Bluetooth interface is in the advertising state, it only sends connectable undirected advertising events. In some embodiments the authentication device's Bluetooth interface supports the Limited Discoverable discovery mode. In some embodiments the authentication device is adapted to initiate the Limited Discoverable discovery mode upon a specific user initiated event, such as the user pressing a button. In some embodiments the authentication device remains discoverable for no more than 60 seconds.

In some embodiments the authentication device supports a number of GATT services. In some embodiments the authentication device supports one or more services, which may be GATT services, for exchanging authentication messages with the host computer. In some embodiments the authentication device supports one or more services, which may be GATT services, for informing the host computer about the state of the authentication device and more in particular about the state of the authentication application on the authentication device. In some embodiments the authentication device may dedicate certain Service Characteristics for receiving certain data (e.g. challenge values or transaction data to be used by the authentication device in generating a dynamic credential) from the host computer connected to the authentication device. In some embodiments the authentication device may dedicate certain Service Characteristics for sending certain data (e.g. dynamic credentials generated by the authentication device, or state information) to the host computer connected to the authentication device.

For example in some embodiments the authentication device may support an authentication application messaging GATT service for exchanging authentication application messages between the authentication device on the one hand and the host computer or the application server (through the host computer) on the other hand. This application messaging GATT service may comprise one Characteristic for transmitting authentication application messages from the host computer to the authentication device and another Characteristic for transmitting authentication application messages from the authentication device to the host computer.

The authentication device may also support another application state information GATT service comprising at least one Characteristic for sending updates on the application state from the authentication device to the host computer.

In some embodiments the application may receive certain data or information from the authentication device by regularly polling the authentication device e.g. by regularly reading one or more Characteristics.

In some embodiments the authentication device may send certain data to the host computer connected to the authentication device using the Bluetooth GATT Notification mechanism. In some embodiments the authentication device may send certain data to the host computer connected to the authentication device using the Bluetooth GATT Indication mechanism. In embodiments wherein the authentication device uses the Indication mechanism to send certain data to the host computer the authentication device may thus get confirmation that the host computer has indeed received the data which the authentication device intended to send to the host computer which in turn may allow the authentication device to ensure that the host computer remains synchronised with the authentication device. For example, in some embodiments an authentication device may be adapted to change application state only when the host computer has confirmed that it has received the latest application state information. In some embodiments the authentication device may send some authentication application messages in multiple packets one after the other (e.g. using the same Characteristic) and may be adapted to send a next packet only after the host computer has confirmed that it has received the previous packet.

In some embodiments the authentication device may be adapted to receive over the Bluetooth interface incoming application messages that may have been generated by an application. In some embodiments the authentication device may be adapted to generate outgoing application messages that the authentication device may communicate to the application over the Bluetooth interface. In some embodiments at least some of these incoming and/or outgoing application messages may have been secured by secure messaging techniques and the authentication device may be adapted to support these secure messaging techniques. The data processing component of the authentication device may be adapted to execute cryptographic algorithms used to secure these application messages. For example the data processing component may be adapted to encrypt and/or decrypt data transported in application messages, and/or may be adapted to generate or verify MACs that may be included into application messages to guarantee the integrity and/or authenticity of these messages.

In some embodiments the authentication device may further comprise a clock (160) for providing a time value which may be used by the authentication device to determine the value of the dynamic variable.

In some embodiments the authentication device may also comprise a biometric sensor (170). In some embodiments the biometric sensor may for example comprise a fingerprint sensor. In some embodiments the fingerprint sensor may for example comprise a swipe sensor.

In some embodiments the authentication device may be a pocket-sized, portable and handheld device. In some embodiments the authentication device may have a length of less than 7 cm, a width of less than 3 cm and a thickness of less than 1 cm. In some embodiments the device may have a total weight (batteries included) of less than 20 gram. In some embodiments the authentication device may have a length of less than 10 cm, a width of less than 6 cm and a thickness of less than 1.5 cm and the authentication device may have a total weight (batteries included) of less than 100 gram.

Figure 2:
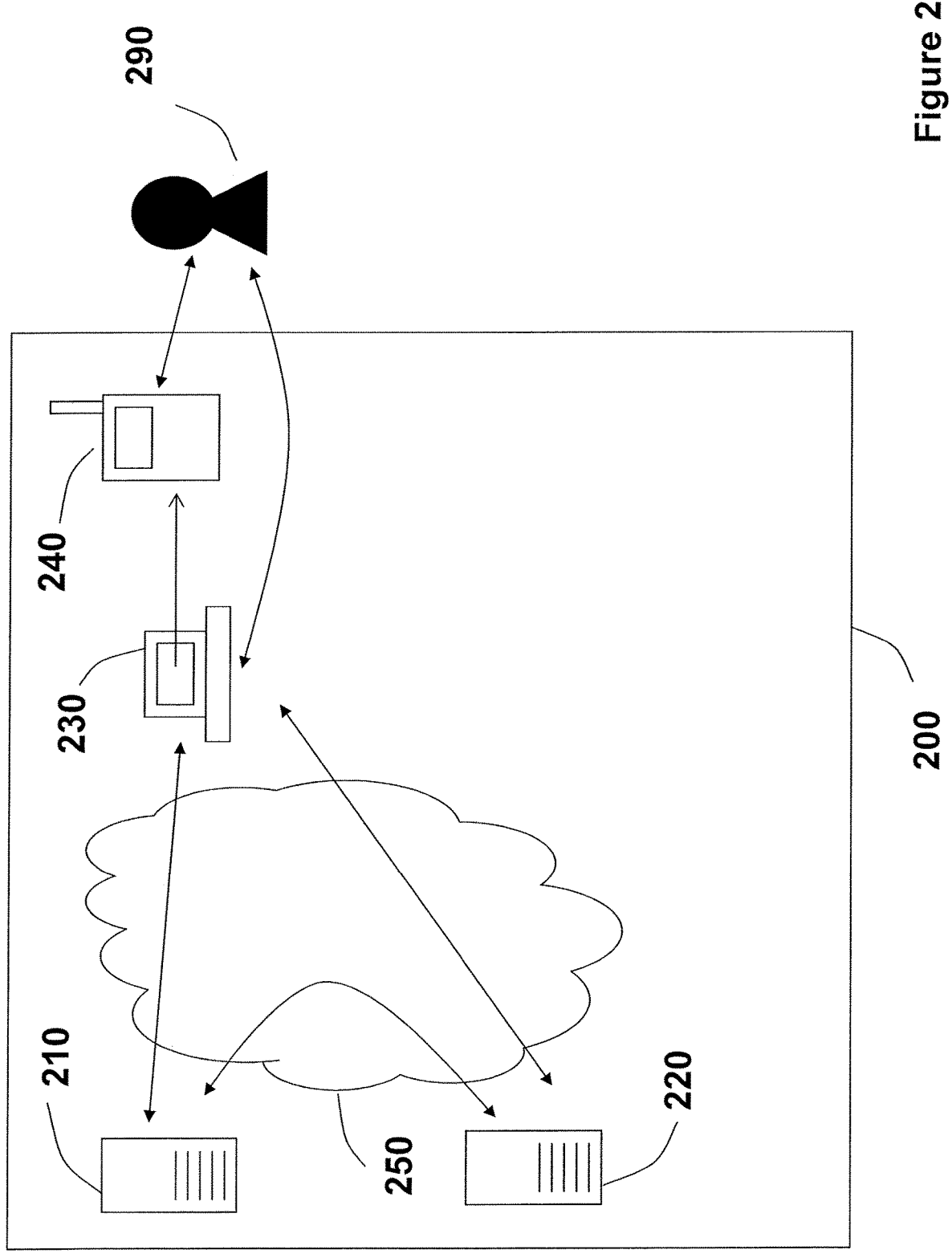
FIG. 2 schematically illustrates an example of a system according to an aspect of the invention.

FIG. 2 schematically illustrates an example of a system according to an aspect of the invention.

In some embodiments a system for securing an interaction between an application and a user such as the system (200) illustrated in FIG. 2 may comprise: an application server(s) (210) for hosting server parts of the application; a host computer (230) for allowing the user (290) to remotely access the application over a public telecommunications network (250); an authentication device (240) for generating a dynamic credential, such as any of the authentication devices described in the preceding paragraphs; and a verification server (220) for verifying the validity of the dynamic credential; whereby the host computer may be adapted to set up a Bluetooth connection with the authentication device and may be adapted to run a client part of the application, the authentication device may be adapted to generate the dynamic credential and to return the dynamic credential to said host computer, the host computer may be further adapted to forward the generated dynamic credential to the verification server for verification; the verification server may be adapted to verify the generated dynamic credential and to signal to the application server whether the dynamic credential has been verified to be valid.

In some embodiments the application server and the verification server may be the same server. In some embodiments the application server and the verification server may comprise one or more server computers. In some embodiments the telecommunications network may comprise the internet and/or a wireless telecommunications network. In some embodiments the host computer may have a user interface for locally interacting with the user. For example in some embodiments the host computer may have a user input interface such as a keyboard, a mouse, or a touchscreen for receiving user input. In some embodiments the host computer may have a user output interface, such as a display or a loudspeaker, for presenting output, which may comprise visual or auditory signals, to a user. In some embodiments the host computer may comprise a PC (personal computer), tablet computer, or smartphone.

In some embodiments the application (such as an internet banking application) may comprise a server part that is running on a remote application server and a client part that is running on the user's local host computer and that the user interacts with to access the server part of the application over e.g. the Internet. In some embodiments the application may comprise a web-based application and the application server may comprise a web server. In some embodiments the application server may be accessed by the user using a web browser on the user's host computer. In some embodiments the client part of the application may comprise an applet (such as a java applet) or a script running in a web browser on the user's host computer. In some embodiments the web browser may use an authentication client plug-in or an authentication client extension to interact with the authentication device that is connected to the host computer via a Bluetooth connection. In some embodiments the user may access the server part of an application with a smartphone. The smartphone may then function as the host computer (230) and the client application running on the smartphone may comprise an app (such as an internet banking app) on the smartphone whereby the app may interact with the user through the user interface of the smartphone, with the application server over e.g. the internet and with the authentication device over a Bluetooth connection between the smartphone and the authentication device. In some embodiments the client part of the application that is running on the host computer may be adapted to provide the user with guidelines on how to interact with the authentication device. In some embodiments the guidelines that the client part of the application may give to the user on how to interact with the authentication device may refer to the actual application state of the authentication device. In some embodiments the client part of the application is adapted to keep track of the actual application state of the authentication device. In some embodiments the authentication device may be adapted to send application state information, which may reflect the actual application state of the authentication device, to the host computer, and the client part of the application running on the host computer may be adapted to receive that application state information and to use that information about the application state of the authentication device to give appropriate guidelines or instructions to the user on how to interact with the authentication device.

For example, in some embodiments while the host computer has not yet detected the presence of an authentication device, the client application on the host computer may instruct the user to turn on an authentication device. When the host computer has set up a Bluetooth connection with the authentication device of the user, the host computer may send a message to the authentication device requesting a dynamic credential, such as a one-time password. In some embodiments the authentication device may, upon receiving such a request message, go into a state whereby it waits for the user to approve the generation of the requested dynamic credential and may indicate this state to the host computer. The host computer may then request the user to indicate to the authentication device (e.g. by pressing a specific button of the authentication device's user input interface) that the user indeed approves the generation of the requested dynamic credential. If the user rejects the request (e.g. by pressing a specific button to indicate rejection) or if a time-out occurs, the authentication device may go to a corresponding state and communicate that state to the host computer whereupon the host computer may take appropriate action.

In some embodiments the application may request the authentication device to sign a number of data fields. For example in some embodiments the client application on the host computer may use the Bluetooth connection to send or forward an application request to the authentication device to sign a number of data fields. In some embodiments the client application may have received this request from a server part of the application and may forward the request to the authentication device using the Bluetooth connection. In some embodiments the authentication device may present the data fields to be signed (using a user output interface of the authentication device) one by one to the user for the user to review and approve on the authentication device (whereby the authentication device may capture the user's approval using the user input interface of the authentication device). In some embodiments each time the authentication device presents a data field to the user for approval it may enter into a state wherein it waits for the user's approval of the data field on the authentication device and may inform the host computer that it is in that state waiting for the user to approve the data field. The client application on the host computer may then request the user to review on the authentication device the data field presented by the authentication device and approve on the authentication device the data field if it appears to be correct. When the user has approved the data field the authentication device may move to a next state in which it presents the next data field and waits for approval of that next data field and it may inform the host computer that it has moved to that next state. The client application on the host computer may use that new state information to deduce that the user has approved the previous data field on the authentication device and that the authentication device is waiting for approval of the next data field and the client application on the host computer may now request the user to review and approve the next data field on the authentication device. If the user rejects a data field or the authentication device times-out while waiting for the user's approval of a data field, the authentication device may move to a corresponding state and inform the host computer of that state. If that state indicates to the host computer that the user rejected the data, the application may cancel the transaction that the data corresponds to. If that state indicates to the host computer that the authentication device timed-out while waiting for the user's approval, the client application on the host computer may ask the user whether the transaction should be cancelled or whether the signature process should be restarted.

Figure 3A:
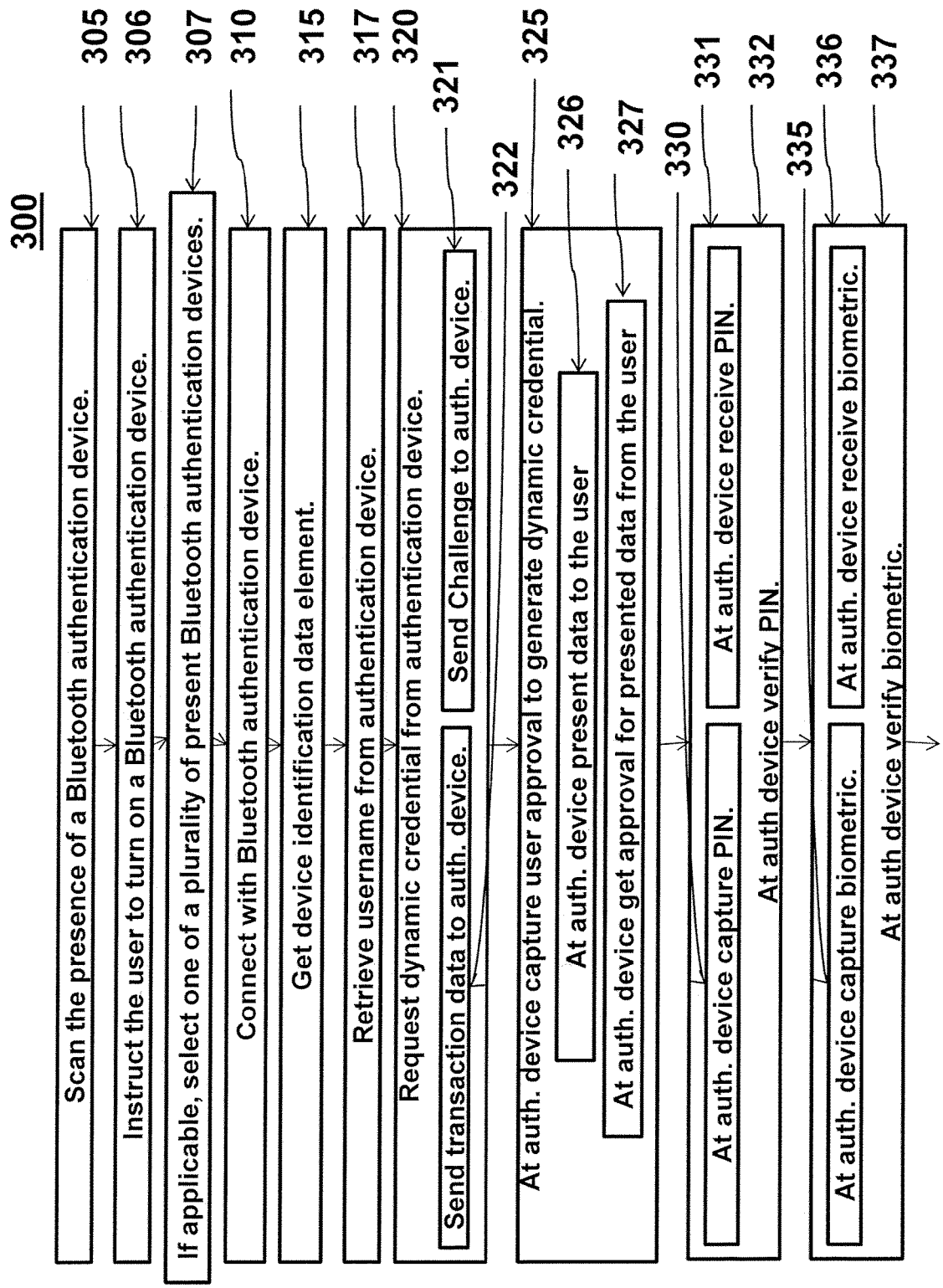
FIGS. 3A and 3B schematically illustrate an example of a method according to an aspect of the invention.
Figure 3B:
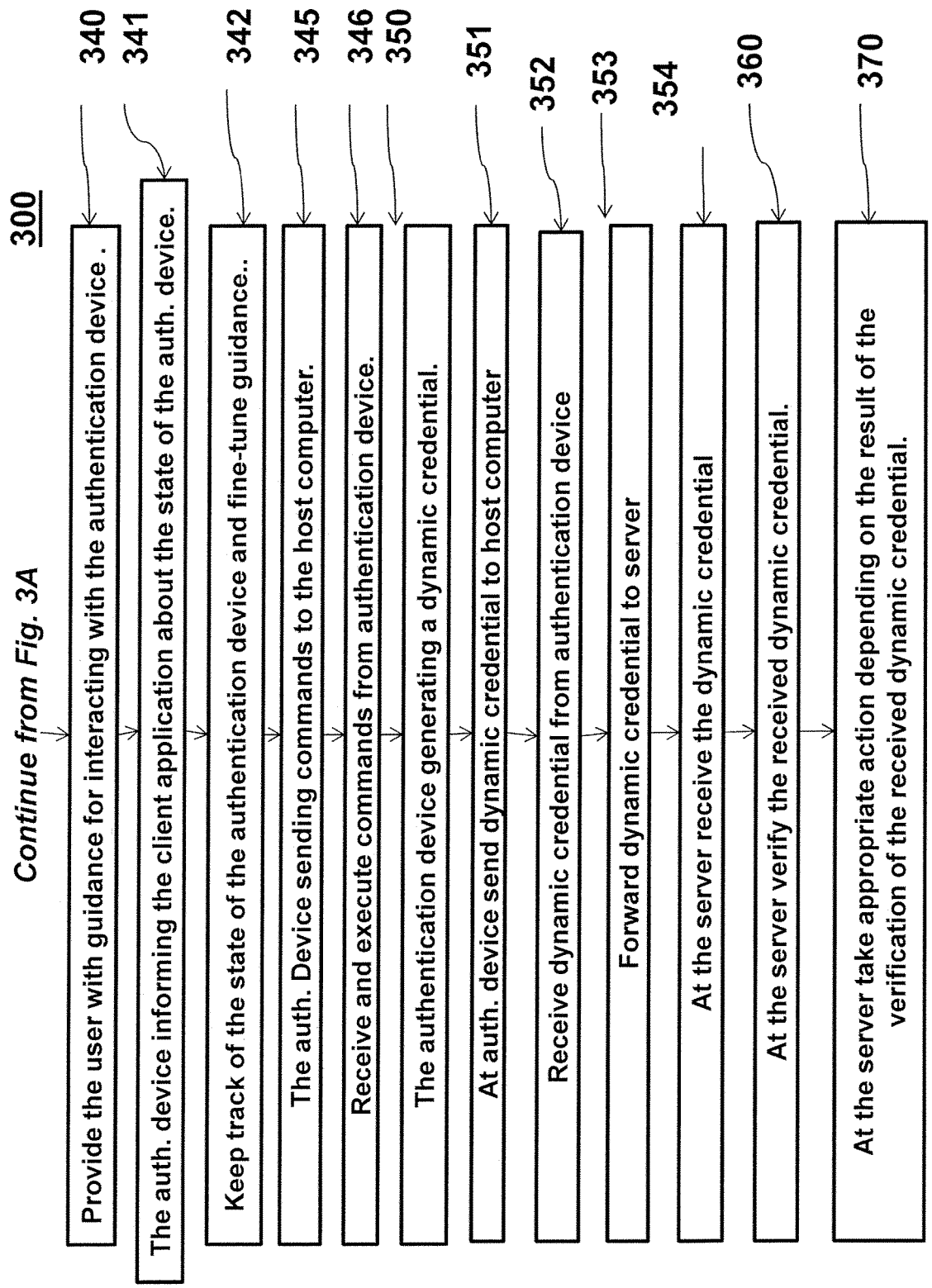

FIGS. 3A and 3B schematically illustrate an example of a method (300) according to an aspect of the invention.

In some embodiments an authentication system and/or an authentication device as described in any of the paragraphs above may be used as follows in a method to secure the interaction of a user with a computer based application. In some embodiments a user may use a client application on a local host computer to interact with an application whereby the local host computer may be connected over a computer network such as for example the internet to a remote application server that is running a server part of the application.

In some embodiments the client application may be scanning (305) for the presence of a (possibly) suitable Bluetooth enabled authentication device. If the client application is not able to detect the presence of a (possibly) suitable active Bluetooth enabled authentication device the client application may request or suggest (306) the user (e.g. by displaying an appropriate message on the user output interface of the host computer) to turn on a Bluetooth enabled authentication device or to activate the Bluetooth interface of an authentication device.

If the client application detects the presence of multiple (possibly) suitable Bluetooth enabled authentication devices, the client application may select (307) one of the authentication devices. For example, in some embodiments the client application may retrieve a device identification data element from each of the detected authentication devices and use that to select the authentication device to interact with. For example the client application may compare the retrieved values of the device identification data element of the detected authentication devices to the device identification data elements of one or more authentication devices that may already have been used in the past with this host computer. In some embodiments the client application may present the user with a list of detected authentication devices and prompt the user to select one.

If the client application has detected a single Bluetooth enabled authentication device or has selected one of a plurality of detected Bluetooth enabled authentication devices, the client application may set up a Bluetooth connection (310) with the detected or selected authentication device.

In some embodiments the client application may retrieve (315) from the authentication device a device identification data element such as a serial number and forward that device identification data element to a server component of the application. In response the client application may receive from the server component of the application a username. In some embodiments the client application may use the Bluetooth connection to retrieve (317) from the authentication device a username. The client application may use the obtained username in further interactions with the server component of the application and/or the user such as for example during a login attempt. In some embodiments the server component of the application may use the received device identification data element to determine the value of one or more secret values or cryptographic keys associated with the authentication device, such as for example a set of secure messaging keys to secure messages to send to the authentication device or one or more secrets for verifying dynamic credentials generated by the authentication device.

In some embodiments the client application may use the Bluetooth connection to request (320) the connected authentication device to generate and return a dynamic credential. In some embodiments the client application may have generated the request. In some embodiments this request may have been generated by a server part of the application and the client application may have received the request from the server part of the application and may forward the request to the authentication device. In some embodiments the client application may send (321) over the Bluetooth connection a challenge to the authentication device to be used by the authentication device in the generation of the dynamic credential. In some embodiments the client application may have received the challenge from a server component of the application. In some embodiments the client application may have interacted with the user to allow the user to define a transaction to be performed by the application and the client application may submit (322) to the authentication device over the Bluetooth connection data related to that transaction to be signed by the authentication device. In some embodiments the client application may communicate the transaction data to the authentication device in an application message that may have been generated by a server part of the application.

In some embodiments the authentication device may capture (325) an approval by the user to generate and/or return a dynamic credential to the host computer running the client application. In some embodiments the authentication device may present (326) data to the user and may capture (327) an approval (or rejection) of the presented data, wherein the presented and approved data may be used by the authentication device in the generation of a dynamic credential.

In some embodiments the authentication device may capture (330) a PIN and/or password value provided by the user to the authentication device or the authentication device may receive (331) over the Bluetooth connection a PIN and/or password value from the client application that the user has provided to the client application. In some embodiments the authentication device may verify (332) the captured or received PIN and/or password as explained in more detail elsewhere in this description.

In some embodiments the authentication device may capture (335) a measurement of a biometric of the user that has been taken by a biometric sensor on the authentication device or the authentication device may receive (336) over the Bluetooth connection a measurement of a biometric of the user from the client application that has been taken by the host computer. In some embodiments the authentication device may verify (337) the captured or received biometric measurement as explained in more detail elsewhere in this description.

In some embodiments the user output interface of the authentication device may have rather limited capabilities such that the authentication device may not be capable of giving the user clear guidance using this user output interface on what state the authentication application on the authentication device is in and what the user can do and what the effect would be of the user's actions. In some embodiments the client application may assist (340) the user in interacting with the authentication device for example by providing guidance on which actions (e.g. pressing various buttons, waiting for a time-out, etc.) the user can and/or should do to obtain certain effects (e.g. approval or rejection of transaction data). In some embodiments the authentication device (341) may inform the client application of the application state it is in. In some embodiments the client application may keep track (342) of the application state the authentication device is in and may use that knowledge to fine-tune its guidance to the user on how to interact with the authentication device so that the guidance it provides is pertinent to the actual application state the authentication device is in, as is explained in more detail elsewhere in this description.

In some embodiments the authentication device may use the Bluetooth connection to send (345) commands to the host computer that it is connected with and the client application on the host computer may receive and execute (346) these commands, as is explained in more detail elsewhere in this description. In some embodiments execution of these commands requires the client application on the host computer to interact (347) with the user e.g. by providing output to the user by for example the user output interface of the host computer and/or obtaining input from the user by for example the user input interface of the host computer.

In some embodiments the authentication device may generate (350) a dynamic credential as explained in more detail elsewhere in this description. In some embodiments the authentication may generate the dynamic credential only if certain conditions have been fulfilled such as for example that a PIN or a password or a biometric measurement have been successfully verified, or that the user has indicated explicit approval to generate the dynamic credential.

In some embodiments, after the dynamic credential has been generated the authentication device may send (351) the generated dynamic credential to the host computer over the Bluetooth connection.

In some embodiments the client application may receive (352) the generated dynamic credential over the Bluetooth connection from the connected authentication device and may forward (353) the received dynamic credential to a server part of the application.

In some embodiments the server part of the application may receive (354) the dynamic credential from the client application and may verify the correctness of the received dynamic credential. In some embodiments the server part of the application may verify (360) the correctness of the received dynamic credential by applying a cryptographic credential verification algorithm that may be parameterized by a cryptographic secret that is associated with the authentication device. In some embodiments the server part of the application may use in the verification of the received dynamic credential a symmetric cryptographic algorithm that is parameterized with a secret cryptographic key that is shared between the authentication device and the verifying server part of the application. In some embodiments the server part of the application may use a device identification data element (such as a serial number) of the authentication device to obtain a secret that it may use in the verification of the dynamic credential. For example in some embodiments the server part of the application may store in a database for each individual authentication device one or more secrets related to that authentication device and may retrieve these secrets from the database using the device identification data element for example in a database query. In some embodiments the server part of the application may determine the value of a secret to use in the verification of a dynamic credential by deriving that value from a master secret and the device identification data element of the authentication device that supposedly has generated the dynamic credential.

In some embodiments the server part of the application may use (370) the result of the verification of the received dynamic credential in deciding whether or not to perform a certain action (such as logging in the user, or granting the user access to an application resource such as certain information, or performing a transaction requested by the user whereby data related to this transaction may have been signed by the dynamic credential). For example, in some embodiments the server part of the application may decide to perform the action if the dynamic credential verification was successful. In some embodiments the server part of the application may decide not to perform the action if the dynamic credential verification was not successful. In some embodiments the server part may also take into account other elements to decide whether or not to perform the action, such as for example the result of the verification of a static PIN or password that the client application may have received from the user and that the server part of the application may have received from the client application.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. In particular with respect to the methods that have been described, some steps of the presented methods may be omitted, other steps may be added, and the order wherein the various steps are being performed may be different than the order in which the these steps have been described. Thus, the

The invention claimed is:

1. A portable handheld authentication device for generating a dynamic credential comprising:
   an authentication application;
   a storage component adapted to securely store a cryptographic credential generation secret key;
   a user input interface for receiving inputs from a user of the authentication device;
   a user output interface for presenting outputs to the user;
   a data processing component adapted to generate said dynamic credential by cryptographically combining said cryptographic credential generation secret key with a dynamic variable; and
   a Bluetooth interface for connecting the authentication device to a host computer with a Bluetooth connection between the authentication device and said host computer;
   wherein said authentication device is adapted to maintain an authentication application state of said authentication application that changes in time and to communicate over the Bluetooth connection information about a present authentication application state of said authentication application to said host computer, wherein said authentication device is configured to:
      receive a request for a dynamic credential through the Bluetooth interface;
      enter a wait-for-approval authentication application state after receiving the request for the dynamic credential;
      communicate over the Bluetooth connection information about the wait-for-approval authentication application state to said host computer;
      receive a user approval or a user rejection via the user input interface; and
      transition from the wait-for-approval authentication application state to a rejection authentication application state responsive to the user rejection or to an approved authentication application state responsive to the user approval;
      wherein said authentication device is further adapted to send said generated dynamic credential over the Bluetooth connection with said host computer.

2. The authentication device of claim 1 further comprising:
   a clock for providing a time value;
   wherein the authentication device is further adapted to determine a value of said dynamic variable as a function of said time value provided by said clock.

3. The authentication device of claim 1 further adapted to:
   store in said storage component a second variable;
   determine a value of said dynamic variable as a function of said stored second variable; and
   update and store in the storage component the value of the second variable when the value of the second variable has been used for generating said dynamic credential.

4. The authentication device of claim 3 wherein said second variable comprises a counter and wherein updating said second variable comprises at least one of monotonically increasing or monotonically decreasing the value of said counter.

5. The authentication device of claim 1 further adapted to receive over said Bluetooth connection a request for said dynamic credential, to generate said dynamic credential with said data processing component in response to said request and to return said generated dynamic credential over said Bluetooth connection.

6. The authentication device of claim 5 further adapted to capture by said user input interface at least one of an approval from said user to generate said dynamic credential prior to generating said dynamic credential or an approval from said user to return said dynamic credential prior to returning said dynamic credential.

7. The authentication device of claim 5 further adapted to receive through said Bluetooth connection a challenge and to use said received challenge to generate said dynamic credential by said data processing component.

8. The authentication device of claim 5 further adapted to receive through said Bluetooth connection transaction related data, to present said received transaction related data to the user by said user output interface, to capture by said user input interface an approval of said user of said transaction related data, and to use said received transaction related data to generate said dynamic credential by said data processing component.

9. The authentication device of claim 1 further adapted to store a device identification data element in said storage component and to make said device identification data element available to said host computer over said Bluetooth connection.

10. The authentication device of claim 1 further adapted to store a username in said storage component and to make said username available to said host computer over said Bluetooth connection.

11. The authentication device of claim 10 further adapted to receive said username over said Bluetooth connection and to store said username in said storage component for later retrieval over said Bluetooth connection.

12. The authentication device of claim 1 further adapted to make available an application state to said host computer over said Bluetooth connection.

13. The authentication device of claim 1 further adapted to send over said Bluetooth connection to said host computer one or more commands to be executed by said host computer.

14. The authentication device of claim 1 further adapted to verify at least one of a PIN or a password.

15. The authentication device of claim 14 further adapted to capture the at least one of said PIN or said password provided to the authentication device through said user input interface.

16. The authentication device of claim 14 further adapted to receive the at least one of said PIN or said password over said Bluetooth connection.

17. The authentication device of claim 14 further adapted to generate said dynamic credential only if said verification of the at least one of said PIN or said password was successful.

18. The authentication device of claim 1 further adapted to store biometric reference data in said storage component and to verify a biometric measurement of said user.

19. The authentication device of claim 18 further comprising a biometric sensor and further adapted to capture said biometric measurement with said biometric sensor.

20. The authentication device of claim 18 further adapted to receive said biometric measurement over said Bluetooth connection.

21. The authentication device of claim 18 further adapted to generate said dynamic credential by said data processing component only if said verification of said biometric measurement was successful.

22. The authentication device of claim 1 wherein said user input interface consists of a single button and wherein said authentication device is further adapted to capture an approval of said user by said user pressing said single button.

23. The authentication device of claim 1 further adapted to at least one of receive or send over said Bluetooth connection application messages that are secured by a secure messaging technique for protecting at least one of the integrity, confidentiality or authenticity of said application messages, whereby the authentication device is further adapted to support said secure messaging technique and to perform cryptographic secure messaging operations that are used in said secure messaging technique whereby said secure messaging technique is independent from any Bluetooth secure messaging mechanism.

24. The authentication device of claim 23 further adapted to store a secure messaging secret in said storage component and to use said secure messaging secret to determine a value of a cryptographic secure messaging key and to use said cryptographic secure messaging key in said cryptographic secure messaging operations.

25. The authentication device of claim 1 wherein said cryptographically combining said cryptographic credential generation secret key with said dynamic variable comprises executing a symmetric cryptographic algorithm parameterized with said cryptographic credential generation secret key.

26. The authentication device of claim 25 wherein said symmetric cryptographic algorithm comprises at least one of a symmetric encryption or a symmetric decryption algorithm.

27. The authentication device of claim 25 wherein said symmetric cryptographic algorithm comprises a keyed hashing algorithm.

28. The authentication device of claim 1 wherein said user input interface consists of two buttons wherein said authentication device is further adapted to capture an approval of said user by said user pressing a first of said two buttons and to capture at least one of a rejection or a cancellation of said user by said user pressing a second of said two buttons.

29. The authentication device of claim 1 wherein said Bluetooth interface supports Bluetooth Low Energy.

30. A system for securing an interaction between an application and a user, said application including a server part and a client part, the system comprising:
an application server hosting said server part of the application;
a host computer running a client application that is said client part of said application and allowing the user to remotely access the server part of the application over a computer network, said host computer comprising a user input interface to receive inputs from the user and a user output interface to provide outputs to the user;
an authentication device for generating a dynamic credential, the authentication device comprising
an authentication application,
a storage component adapted to securely store a cryptographic credential generation secret key,
a data processing component adapted to generate said dynamic credential by cryptographically combining said cryptographic credential generation secret key with a dynamic variable, and
a Bluetooth interface for connecting the authentication device to said host computer with a Bluetooth connection between the authentication device and said host computer; and
a verification server for verifying the validity of said dynamic credential;
whereby
said host computer is adapted to set up the Bluetooth connection with said authentication device;
said authentication device is adapted to maintain an authentication application state of said authentication application that changes in time and to communicate over said Bluetooth connection information about a present authentication application state of said authentication application to said host computer;
said client application on the host computer is adapted to receive over said Bluetooth connection said present authentication application state information from said authentication device, provide at least one of guidelines or instructions to said user on how to deal with said authentication device whereby the at least one of said guidelines or instructions are a function of said received present authentication application state information;
said authentication device is further adapted to return said dynamic credential via the Bluetooth connection to said host computer;
said client application on the host computer is further adapted to receive said dynamic credential via said Bluetooth connection and to forward said generated dynamic credential to said verification server for verification;
said verification server is adapted to verify the generated dynamic credential and to signal to said application server whether the dynamic credential has been verified to be valid.

31. The system of claim 30 wherein
said authentication device and said verification server share said cryptographic credential generation secret key;
said generation and said verification of said dynamic credential is done with a symmetric cryptographic algorithm using a secret authentication key that is shared between said authentication device and said verification server.

32. The system of claim 30 wherein
said authentication device shares one or more secure messaging keys with at least one of said verification server or said application server;
at least one of said application server or said verification server is adapted to generate an application message and to secure said application message with secure messaging techniques using said shared one or more secure messaging keys;
said client application is adapted to receive said secured application message and to forward said secure application message to said authentication device over said Bluetooth connection; and
said authentication device is adapted to receive over said Bluetooth connection said secured application message and to support said secure messaging techniques using said shared one or more secure messaging keys and act upon said secured application message.

33. The system of claim 30 wherein said authentication device is adapted:
to receive over said Bluetooth connection an application message containing a request for the authentication device to generate and return said dynamic credential; and in response to receiving said application message, to generate said dynamic credential and return said dynamic credential over said Bluetooth connection.

34. The system of claim 33 wherein said application message contains a challenge and wherein said dynamic variable is based on said challenge.

35. The system of claim 34 wherein said challenge contains an unpredictable value that is generated by at least one of said application server or said verification server.

36. The system of claim 33 wherein said application message contains transaction data submitted by said user to said application and wherein said dynamic variable is based on said transaction data.

37. The system of claim 30 wherein
said client application is further adapted to obtain by said user input interface of said host computer at least one of a PIN value or a password value from said user and to send the at least one of said obtained PIN value or said obtained password value over said Bluetooth connection to said authentication device; and
said authentication device is further adapted to receive over said Bluetooth connection the at least one of said PIN value or said password value and to verify the at least one of said received PIN value or said received password value.

38. The system of claim 30 wherein
said host computer further comprises a biometric measurement component adapted to capture a biometric measurement from said user;
said client application is further adapted to obtain by said biometric measurement component of said host computer a biometric measurement from said user and to send said obtained biometric measurement component over said Bluetooth connection to said authentication device; and
said authentication device is further adapted to receive over said Bluetooth connection said biometric measurement and to verify said received biometric measurement.

39. The system of claim 30 wherein
said authentication device is further adapted to generate commands to be executed by said host computer and to communicate said commands to said host computer over said Bluetooth connection; and
said client application is further adapted to receive said commands over said Bluetooth connection from said authentication device and to perform said commands.

40. The system of claim 39 wherein performing said commands by said host computer comprises said host computer interacting with said user using at least one of said user output interface or said user input interface.

41. The system of claim 30 wherein
said client application is further adapted to obtain, when said authentication device is connected to said host computer by said Bluetooth connection, an indication of the distance of said authentication device to said host computer; and
wherein said application is adapted to take into account said distance indication when deciding whether to grant, maintain or revoke one or more access rights for said user.

42. A method to secure the interaction of a computer-based application with a user, wherein the computer-based application includes a client part and a host part,
whereby the user operates an authentication device for generating a dynamic credential,
the authentication device comprising an authentication application and a Bluetooth interface for communicating with a Bluetooth host device, the method comprising the steps of:
running on a local host computer a client application that is said client part of the computer-based application for allowing the user to interact with the computer-based application by using a user input interface and a user output interface of the local host computer;
setting-up at the local host computer a Bluetooth connection with the authentication device;
receiving at said local host computer over said Bluetooth connection from said authentication device information on a present authentication application state of the authentication application;
providing at the local host computer by said user output interface at least one of guidelines or instructions concerning the operation of said authentication device to the user, whereby the at least one of said guidelines or said instructions are a function of said received information on the present authentication application state of the authentication application;
receiving over said Bluetooth connection from the authentication device the dynamic credential, the dynamic credential generated by said authentication device by cryptographically combining a dynamic variable with a first cryptographic authentication key stored in said authentication device; and
verifying said dynamic credential using a cryptographic algorithm that is parameterized with a second cryptographic authentication key.

43. The method of claim 42 further comprising the steps of:
generating an application message;
securing said application message by applying secure messaging techniques that are based on a symmetric cryptographic algorithm that is parameterized with at least one symmetric secure messaging key that is shared with said authentication device; and
at the host computer sending said application message over said Bluetooth connection to the authentication device.

44. The method of claim 42 further comprising the steps of:
generating an application message comprising a request for the authentication device to generate and return said dynamic credential, and
at the host computer sending said application message over said Bluetooth connection to the authentication device,
whereby the authentication device generates and returns said dynamic credential over said Bluetooth connection to the host computer in response to the authentication device receiving said application message over said Bluetooth connection.

45. The method of claim 44 further comprising the steps of:
generating a challenge; and
including said challenge in said application message;
whereby said dynamic variable is based on said challenge.

46. The method of claim 44 further comprising the steps of:
receiving from said user a request for performing a transaction;
including in said application message transaction data representing said transaction; and performing said transaction request if said verifying of said dynamic credential is successful;

whereby said dynamic variable is based on said transaction data included in said application message.

47. The method of claim 42 further comprising the steps of receiving at said local host computer over said Bluetooth connection from said authentication device a command to be performed and performing said command at said local host computer.

48. The method of claim 42 further comprising the steps of obtaining at said local host computer at least one of a PIN value or a password value from said user by said user input interface and sending the at least one of said obtained PIN value or said obtained password value over said Bluetooth connection to said authentication device for the at least one of said PIN value or said password value to be verified by said authentication device.

49. The method of claim 42 further comprising the steps of obtaining at said local host computer a biometric measurement from said user by a biometric sensor and sending said obtained biometric measurement over said Bluetooth connection to said authentication device for said biometric measurement to be verified by said authentication device.

50. The method of claim 42 further comprising the steps of obtaining at the local host computer a distance indicating value that is indicative of the actual distance between the local host computer and the authentication device and using said distance indicating value in determining whether to grant one or more access rights to the user.

51. The method of claim 42 further comprising the steps of:

obtaining at the local host computer a distance indicating value that is indicative of the actual distance between the local host computer and the authentication device; and using said distance indicating value in determining whether to grant, maintain, or revoke one or more access rights to the user.

52. The method of claim 51 further comprising the steps of comparing said distance indicating value to a predefined threshold value and revoking at least one of said one or more access rights to the user if said comparing indicates that the authentication device is farther from the host computer than the distance associated with said threshold value.

53. The method of claim 51 further comprising the steps of comparing said distance indicating value to a predefined threshold value and granting at least one of said one or more access rights to the user if said comparing indicates that the authentication device is closer to the host computer than the distance associated with said threshold value.

* * * * *